US012705575B2

(12) United States Patent
Rellas et al.

(10) Patent No.: US 12,705,575 B2
(45) Date of Patent: Aug. 11, 2026

(54) SCALABLE SYSTEMS OF SITE INVENTORY SCANNERS AND VEHICLES FOR DYNAMIC ASSESSMENT, DEPLOYMENT AND RECONCILIATION OF INVENTORIES

(71) Applicant: Greater Industries Labs, Inc., Dover, DE (US)

(72) Inventors: Nicholas Rellas, Sherborn, MA (US); Ana Cecilia Pizzurro, Chesterfield, NH (US)

( * ) Notice: Subject to any disclaimer, the term of this patent is extended or adjusted under 35 U.S.C. 154(b) by 55 days.

(21) Appl. No.: 18/756,073

(22) Filed: Jun. 27, 2024

(65) Prior Publication Data

US 2025/0029057 A1 Jan. 23, 2025

Related U.S. Application Data

(60) Provisional application No. 63/523,617, filed on Jun. 27, 2023.

(51) Int. Cl.

| | |
|---|---|
| ***G06Q 10/087*** | (2023.01) |
| ***G06Q 10/047*** | (2023.01) |
| ***G06Q 10/083*** | (2023.01) |

(52) U.S. Cl.

CPC ......... *G06Q 10/087* (2013.01); *G06Q 10/047* (2013.01); *G06Q 10/083* (2013.01)

(58) Field of Classification Search

CPC .. G06Q 10/087; G06Q 10/047; G06Q 10/083; G06Q 10/0838

See application file for complete search history.

(56) References Cited

U.S. PATENT DOCUMENTS

| | | | |
|---|---|---|---|
| 12,217,208 B2 * | 2/2025 | Powers | B65G 1/137 |
| 12,340,345 B2 * | 6/2025 | McPheters | G06Q 10/087 |
| 2006/0136237 A1 * | 6/2006 | Spiegel | G06Q 10/0835 705/13 |
| 2014/0249884 A1 * | 9/2014 | Hong | G06Q 10/06315 705/7.25 |
| 2016/0239855 A1 * | 8/2016 | Feng | G06Q 30/0202 |
| 2020/0210947 A1 * | 7/2020 | Devarakonda | G06Q 10/06393 |
| 2021/0261335 A1 * | 8/2021 | Lert, Jr. | G06Q 10/08 |
| 2024/0346439 A1 * | 10/2024 | Martin, Jr. | B65G 57/03 |

* cited by examiner

*Primary Examiner* — Garcia Ade

(74) *Attorney, Agent, or Firm* — Duane Morris LLP

(57) ABSTRACT

A dynamic assessment, deployment and reconciliation system of a plurality of different, non-durable SKUs for different retail facilities in different geographic areas comprising a processor, a network interface coupled to the processor, and a memory coupled to the processor. The memory includes programming which when executed configures the system to periodically perform the following functions. To receive a target SKU count input of a target SKU. To receive an actual SKU count input of the target SKU on an assessment date. To simulate, using a trained model, an effect of time on a quantity of target SKU required for delivery, using a date difference between the assessment date and a future delivery date and a SKU count difference, to determine a projected target SKU count. To issue a packing instruction configured to instruct a packing of the target SKU onto a transportation vehicle at a dynamically selected intermediate facility.

20 Claims, 6 Drawing Sheets

SCALABLE SYSTEMS OF SITE INVENTORY SCANNERS AND VEHICLES FOR DYNAMIC ASSESSMENT, DEPLOYMENT AND RECONCILIATION OF INVENTORIES

CROSS-REFERENCE TO RELATED APPLICATIONS

This application claims priority to U.S. Provisional Patent Application No. 63/523,617, filed on Jun. 27, 2023, entitled "METHOD AND SYSTEM FOR CONVERTING FIXED COSTS INTO VARIABLE COSTS," the entire disclosure of which is incorporated here by reference.

FIELD

The present disclosure relates to improved scalable systems of inventory scanners and vehicles for dynamic assessment, deployment and reconciliation of inventories, and methods of utilization thereof. Specifically, the present disclosure relates to improved systems of analyzing inventory scanned by on-site scanners in concert with computer-implemented systems and methods to dynamically assess, deploy and reconcile inventories via one or more vehicles and between the scanned sites and inventory locations, and methods of utilization thereof.

BACKGROUND

Manufacturers or suppliers produce or import goods, and sell or contract for sale those goods to wholesalers and distributors. Those wholesalers and distributors establish relationships with retailers, and facilitate moving the manufacturers' goods from the manufacturer/supplier to the retailers. Ultimately, the goods will be sold to consumers by retailers. The process of moving product downstream from a supplier and selling the product at a retailer for a particular manufacturer and product is referred to as a product and manufacturer's route-to-market (RTM). In order to facilitate movement from manufacturing to retail, suppliers and manufacturers use distribution channels.

Distributors and wholesalers generally manage the details of the indirect relationships between manufacturers and retailers: rather than one retailer coordinating thousands of relationships with thousands of manufacturers to facilitate the sale of thousands of different products, the retailer instead will have a logistical relationship with a single or a small handful of distributors to streamline product availability or arrangements. Likewise, rather than one manufacturer coordinating hundreds of thousands of relationships with each of the hundreds of thousands of retailers which sell their product, the manufacturer may have a single distributor which facilitates the flow of their goods for sale at contracting retailers.

Goods distribution has three core concerns: space, labor, and movement. The traditional paradigm has been simple: minimize the costs associated with those three core concerns involved in distribution. This paradigm has resulted in innovations largely around decreasing latency times on the RTM, rather than increasing capacity of the RTM. The traditional paradigm is largely structurally codified across the three areas of concern:

- Obtain warehouse space in areas outside of dense population, optimizing largely toward lower real estate costs.
- Increase gains in efficiency for movement of goods, generally by implementing business rules (e.g., the requirements of minimum orders, delivery lead times, etc.) The lowest levels of innovation in hardware have been directed to improving movement, with software use limited primarily to routing improvements, while improvements in trucks and other transportation are at the whim of original equipment manufacturer (OEM) efficiency and performance gains.
- Optimize labor efficiency within the warehouse, with innovations in sorting, batching, and picking, minimizing the need for total human labor headcount over time.

To facilitate these efficiencies, wholesalers pull demand by instructing sales representatives to visit retailers (e.g., stores) ahead of delivery and ascertain product demand. Generally, three people are employed to perform the retail RTM tasks which could be performed by one delivery person. Delivery and fulfillment are reactive, not proactive, steps in the distributor model.

The result of utilizing the reactive fulfillment distributor model is a paradigm where wholesale distributors are forced to maintain capacity to facilitate peak demand from their retailer customers across all fixed asset of their business (warehouse, trucks, etc.) instead of optimizing supply for an average day. This over-architected capacity leads to scaled assets being used for sub-scale activity on any given non-peak demand day. Because of these distribution requirements, expanding business requires tremendous capital expenditures (cap-ex). In order for a wholesale distributor to increase their revenue they must also increase their supply, tying revenue, supply costs, and resultantly profit, to a linear model.

Specifically, in order to grow the commercial scale of a wholesale distributor, those wholesalers have two potential options: the wholesaler can increase the amount of products (either by increasing the variety of stock-keeping units (SKUs) distributed, or by enticing retailers to order larger quantities of existing SKUs) they are selling to existing accounts, or they can search for new accounts. Both of these options require investment in scaling the underlying components (such as property, plant, and equipment (PP&E) or employee headcount) of their business. Adding new products means increasing warehouse space. Selling new accounts means hiring more salespeople, obtaining additional trucks and drivers, while also requiring increased warehouse space (inventory is now turned faster, therefore meeting existing days-on-hand inventory requirements will necessitate that the wholesaler to hold more inventory quantity at any given time). Thus, any increase in the scale of the wholesale requires large capital expenditures and increased operating expenses.

The "scale" created by integrating wholesalers both vertically and horizontally that now characterizes the modern supply chain has reached the limits of its ability to provide further improvement to commercial economics. Further, the modern supply chain has substantial inefficiencies in moving products downstream. This model worked under the economic assumptions of moderately inflating industrial real estate (RE), fuel, and labor costs.

SUMMARY

Hence, there is room for further improvement in the systems and methods of scanning on-site inventory and dynamically assessing, deploying and reconciling inventory via vehicles and between those sites and the inventory locations. The disclosed systems and methods allow wholesalers and distributors to turn fixed costs into variable costs, i.e., costs that can be toggled up, down, on and off, in the same way that cloud server infrastructure can be adjusted. By fulfilling retailers' orders with improved efficiency, a distributor's warehousing needs will to decrease, resulting in their capital expenditures and operating expenses significantly shrinking.

On-site scans and analysis of presently-stocked stock-keeping units SKUs on a certain date at retailer locations can be combined with projections based upon multi-period historical consumption rates in order to accurately determine the proper amount of goods to deliver on a date later than the certain date. These projections may be augmented or improved by examining consumption rates across multiple retailers and retail locations. Additionally, in circumstances involving fungible or nearly-fungible goods, multiple projections across multiple retailers can be combined in order to produce a projection-based vehicle loadout for a given delivery route including the multiple retailers. Computer-implemented methods can facilitate making these dynamic determinations based on historical, temporal, microeconomic, and macroeconomic data in combination with live data from multiple physical retailers in order to deliver real-time or near real-time projections for vehicle loads of appropriate goods, facilitating delivery plans far beyond what can be performed with current systems and methods, and far beyond what can practically be performed in the human mind.

In a first example, a dynamic assessment, deployment, and reconciliation system of a plurality of different, non-durable stock-keeping units (SKUs) for a plurality of different retail facilities in a plurality of different geographic areas includes a processor, a network interface configured for data communication over a network and coupled to the processor, and a memory coupled to the processor. The system further includes programming in the memory, wherein execution of the programming by the processor configures the system to implement the following functions. The system receives a target SKU count input of the target SKU. Over the network interface, the system receives an actual SKU count input of the target SKU on an assessment date. The system determines a future delivery date, the future delivery date later than the assessment date. The system calculates a date difference, the date difference based on a difference between the assessment date and the future delivery date. The system calculates a count difference, the count difference based on a difference between the target SKU count input and the actual SKU count input. The system simulates, using a trained model, an effect of time on a quantity of target SKU required for delivery, using the date difference and the count difference to determine a projected target SKU count. Based on the projected target SKU count, the system issues a packing instruction configured to instruct a packing of the target SKU onto a transportation vehicle at a dynamically selected intermediate facility.

In a second example, a method includes receiving a target SKU count input of a target SKU. The method includes receiving, over a network interface, an actual SKU count input of the target SKU on an assessment date. The method includes determining a future delivery date, the future delivery date later than the assessment date. The method includes calculating a date difference, the date difference based on a difference between the assessment date and the future delivery date. The method includes calculating a count difference, the count difference based on a difference between the target SKU count input and the actual SKU count input. The method includes simulating, using a trained model, an effect of time on a quantity of target SKU required for delivery, using the date difference and the count difference to determine a projected target SKU count. The method includes issuing, based on the projected target SKU count, a packing instruction configured to instruct a packing of the target SKU onto a transportation vehicle at a dynamically selected intermediate facility.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

DETAILED DESCRIPTION

Figure 1:
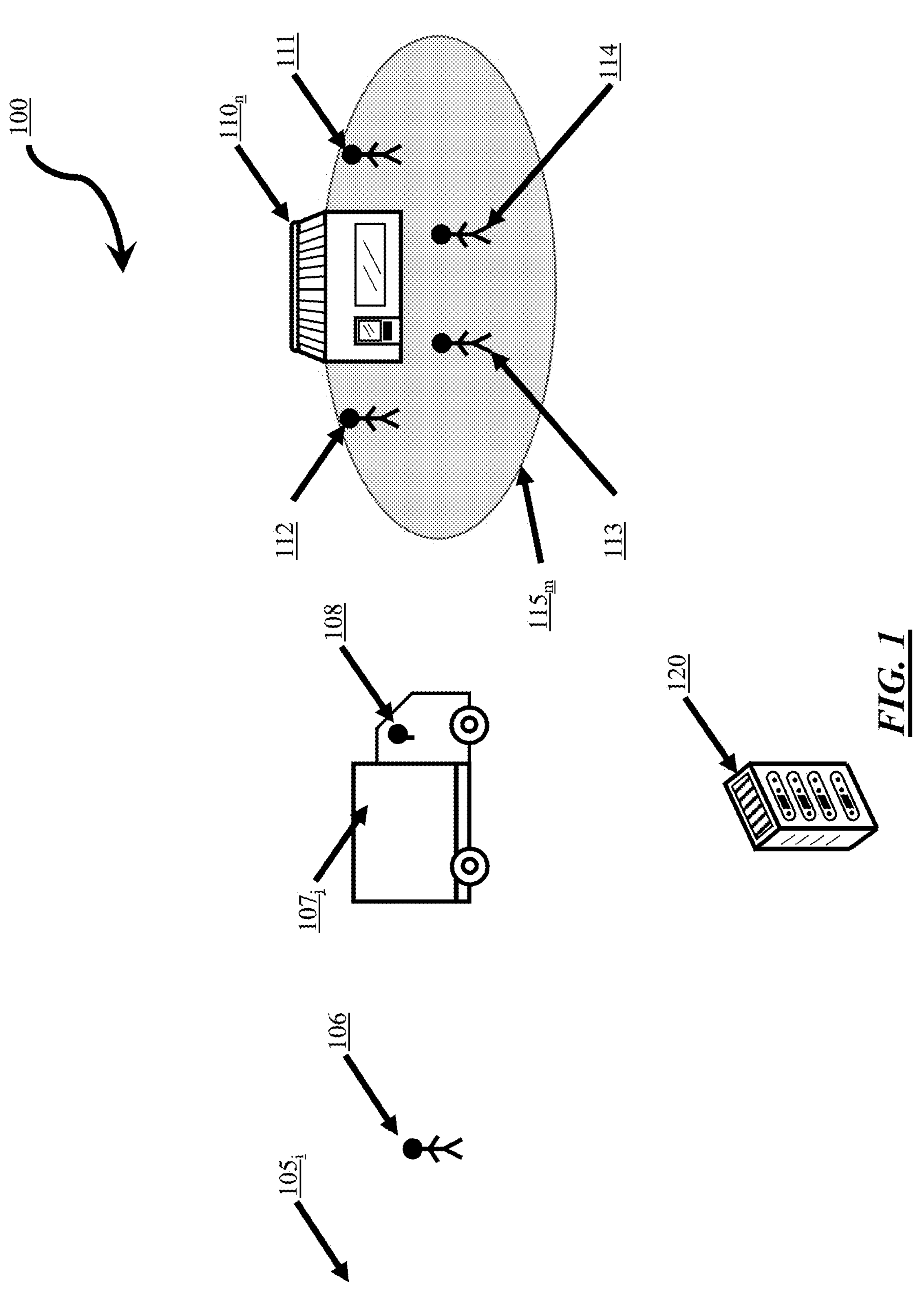
FIG. 1 is an exemplary diagram of the relationship between direct agents implementing an efficient product deployment paradigm.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" may refer to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the signals, actions, or messages.

The following terms may be utilized in the present disclosure. A "2-D barcode" is a two-dimensional bar code that may be based on a flat set of rows of encrypted data in the form of bars and spaces, normally in a rectangular or square pattern. A "3-D Barcode" is a three-dimensional bar code that may be based on a physically embossed or stamped set of encrypted data interpreted by variations in height rather than contrast between spaces and bars (as used in 2D bar codes) that is often used in environments where labels cannot be easily attached to items. "3rd Party Logistics (3PL)" may be a warehouse that is managed on behalf of the owner of the stock. The type of activities and how a 3PL operates will vary according to the type of organization it is. For example, a 3PL could operate as a fulfilment services provider or as a managed warehousing facility. "ABC Analysis" is a classification of items in an inventory according to importance that may be defined in terms of criteria such as sales volume and purchase volume. "ABC Classification" is a classification of a group of items that may be in decreasing order of, for example, annual dollar volume or other criteria. This array may then be split into three classes called A, B, and C. For example, the A group may represent 10% to 20% by number of items, and 50% to 70% by projected dollar volume. The next grouping, B, may represent about 20% of the items and 20% of the dollar volume. The C-class may contain, for example, 60% to 70% of the items, and may represent about 10% to 30% of the dollar volume. "Account" may refer to a business which is a purchaser of product from a wholesaler. "Active Stock" may refer to goods in active pick locations and ready for order filling. "Advanced Shipping Notice ("ASN") may refer to a document that is prepared by a supplier (the shipper) and submitted to a retailer (the receiver) that specifies the shipping dates and physical attributes (SKUs, quantities, weight, etc.) of the shipment so the receiving party can be prepared for delivery and check-in. ASN may also be known as a "manifest". "Allocated Item" may refer to an item that has a restricted quantity available for sale. Items may then be allocated to retailers in various quantities based on certain criteria. "Ambient Storage" may refer to storage that is kept at room, ambient temperature as opposed to cold storage, or refrigerated storage. "Assortment" may refer to the types of products that a wholesaler may offer to retailers, and highlights the importance of giving buyers a wide range and variety of product types, sizes, colors, price lists and more. "Backorder" may refer to products that have been ordered, but not yet shipped, and may occur when the manufacturer lacks stock or when orders for items are received before production has started. "Backstock" may refer to inventory that is in the backroom of a retailer, inaccessible to customers, or otherwise stored in an area that is not the main shelf location of said product, such as, for example, either in a fridge or around the store. "Bay," e.g. warehouse or loading, may refer to the space in a warehouse where a truck is able to be loaded and unloaded from outside/inside the warehouse. For example, a loading bay is encompassed under the term "Bay". "Bill of Lading (BOL)" may refer to a transportation document that is the contract of carriage containing the terms and conditions between the shipper and carrier. "Bonded Warehouse" may refer to a warehouse approved by the Treasury Department and under bond/guarantee for observance of revenue laws, and that may be used for storing goods until duty is paid or goods are released in some other proper manner. "Buyback" may refer to a condition when a retailer negotiates with a wholesale seller to accept back or repurchase unsold inventory.

The present disclosure further utilizes the following additional terms. "CapEx" may refer to the monetary requirements (capital expenditure) of an initial investment in, for example, new machines or equipment. "Dark Store" may refer to a large retail facility that resembles a conventional supermarket or other store but is not open to the public, housing goods used to fulfill orders placed online. "Date Code" may refer to a label on products with the date of production. In food industries, a date code is often an integral part of the lot number. "Days of Supply" may refer to a measure of quantity of inventory on hand in relation to number of days for which usage will be covered. For example, if a component is consumed in manufacturing at the rate of 100 per day, and there are 1,585 units available on hand, this represents 15.85 days of supply. "Delivery Window" may refer to the timeframe within which goods are produced and shipped to retailers. This is a standard practice for businesses working in, for example, the food supply industry as their buyers want to ensure that the goods will be on their shelves before they expire. "Direct Store Delivery" may refer to the process of shipping direct from a manufacturer's plant or distribution center to the customer's retail store, thus bypassing the customer's distribution center. "EDI Interchange" may refer to the communication between partners in the form of a structured set of messages and service segments starting with an interchange control header and ending with an interchange control trailer. For example, in the context of X.400 EDI messaging, the contents of the primary body of an EDI message. "EDI Standards" may refer to the criteria that define the data content and format requirements for specific business transactions (e.g., purchase orders). Using standard formats allows companies to exchange transactions with multiple trading partners more easily. "Electronic Data Interchange (EDI)" may refer to intercompany, computer-to-computer transmission of business information in a standard format. For EDI purists, computer to computer may refer to direct transmission from the originating application program to the receiving or processing application program. An EDI transmission may include only business data, not any accompanying verbiage or free-form messages. "FinTech" may refer to software that allows accounts to pay for deliveries automatically and electronically. "FOB" may be a term of sale specifying an entity that is to incur transportation charges for the shipment, which is to control the shipment movement, or where title to the goods passes to the buyer; originally meant "free on board ship." "Fulfillment" may refer to the act of fulfilling a customer order, and may include order management, picking, packaging.

The present disclosure further utilizes the following additional terms. "Hub" may refer to a large retailer or manufacturer having many trading partners, or may be a reference for a transportation network as a "hub and spoke" which is common in the airline and trucking industry. For example, a "hub" airport serves as the focal point for the origin and termination of long-distance flights where flights from outlying areas are fed into the hub airport for connecting flights. A "hub" may refer to a common connection point for devices in a network. A web "hub" is one of the initial names for what is now known as a "portal", and which came from a creative idea of producing a web site which would contain many different "portal spots" (small boxes that looked like ads with links to different, yet related content). This content, combined with Internet technology, made the idea a milestone in the development and appearance of web sites, primarily due to the ability to display a lot of useful content and store one's preferred information on a secured server. "Merchandising" may refer to taking cases/singles off of pallets and putting them where they belong in the store, either against walls, in beer caves, or in racks in a cooler (think convenience stores). "Minimum Order Quantity (MOQ)" may refer to the minimum order size accepted by a wholesale seller. Generally, MOQ is based on the minimum order a wholesale seller needs in order for the transaction to be profitable for the wholesale seller. Eventually, it's up to a user (e.g., a wholesale seller), to determine what size an order must be to get a wholesale price break. "Picking" may refer to the operations involved in pulling products from storage areas to complete a customer order. "Routing" may refer to the process of determining how shipment will move between origin and destination, and routing information may include designation of carrier(s) involved, actual route of carrier, and estimate time en route. "Routing" may refer to a right of shipper to determine carriers, routes, and points for transfer shipments. In manufacturing, "routing" may refer to a document which defines a process of steps used to manufacture and/or assemble a product. "Sideloader Truck" may refer to a truck that provides access to cargo from both the right and left side, may be loaded and unloaded from the ground level, making it easier for drivers to load inventory directly onto dollies, and where items may be stored in truck bays by SKU rather than by stop. "Slotting" may refer to the placement of products within a warehouse facility, and with an objective of increasing picking efficiency and reducing warehouse handling costs through optimizing product location and balancing the workload. "Staging" may refer to pulling material for an order from inventory before the order is required. A "staging" action is often taken to identify shortages, but it can lead to increased problems in availability and inventory accuracy. A "stock-keeping unit (SKU)" may refer to a unique code (or series of numbers) assigned to each style of product in your line. SKUs are most often used when a seller has a large inventory to manage, and is a code that is usually shown on purchase orders and pick lists. "Stockout" may refer to a situation where an entity has inadequate inventory levels to meet current demand. "User" may refer to anyone or anything that is capable of using/implementing the disclosed systems and/or methods. "Warehouse Management System (WMS)" may refer to systems used in effectively managing warehouse business processes and direct warehouse activities, including receiving, putaway, picking, shipping, and inventory cycle counts, may also include support of radio frequency communications, allowing real-time data transfer between the system and warehouse personnel, and may also maximize space and minimize material handling by automating putaway processes.

Reference is now made in detail to the examples illustrated in the accompanying drawings and discussed below.

FIG. 1 is an exemplary diagram of a relationship between direct agents implementing an efficient product deployment paradigm 100. In exemplary efficient product deployment paradigm 100, goods (e.g., non-durable SKUs) are moved from one or more warehouses $\mathbf{105}_i$ to a retail facility $\mathbf{110}_n$ via a vehicle $\mathbf{107}_j$. While warehouse $\mathbf{105}_i$ may house a variety of goods, and retail facility $\mathbf{110}_n$ may stock a separate variety of goods, the subset of "relevant goods" includes those goods stored at a warehouse $\mathbf{105}_i$, stocked at a retail facility $\mathbf{110}_n$, and managed by management server 120.

Warehouse $\mathbf{105}_i$ is a commercial space used to store goods and materials. Warehouse $\mathbf{105}_i$ may include one or more warehouses. Each warehouse $\mathbf{105}_i$ may be a dedicated traditional warehouse, or may be excess commercial space, a shipping container, a storage unit, stockpiles, or other non-traditional or ad hoc storage facilities. Warehouse $\mathbf{105}_i$ personnel, such as warehouse loading 106 personnel, may perform tasks such as sorting of goods, operating lift equipment, storing or slotting and pulling or picking goods into warehousing areas of warehouse $\mathbf{105}_i$, packing and unpacking a vehicle $\mathbf{107}_j$ (e.g., a bay of a truck $\mathbf{107}_j$) via a warehouse bay, and/or receiving goods from a producer, manufacturer, or manufacturing line. Warehouse $\mathbf{105}_i$ may also be referred to as an intermediate facility.

Retail facility $\mathbf{110}_n$ is a business which receives goods from one or more warehouses $\mathbf{105}_i$ in order to sell those goods to retail consumers. Retail consumers generally purchase goods from a retail facility $\mathbf{110}_n$ for consumption rather than for resale or as intermediate materials in more refined or complex goods. Retail facility $\mathbf{110}_n$ may have warehousing space, but such warehousing space will generally be limited as compared to the total storage capacity of warehouse $\mathbf{105}_i$, respective to the goods carried through a warehouse $\mathbf{105}_i$ to a retail facility $\mathbf{110}_n$. Retail facility $\mathbf{110}_n$, which is a physical location or legal entity, may be distinct from a retailer 111, which is a physical person, employee, or owner of a retail facility $\mathbf{110}_n$. However, in many contexts, in particular with respect to concepts of agency, retail facility $\mathbf{110}_n$ and retailer 111 may be indistinguishable and may be interchanged.

Each vehicle $\mathbf{107}_j$ may be a transportation vehicle configured to move goods from a warehouse $\mathbf{105}_i$ to a retail facility $\mathbf{110}_n$. Vehicle $\mathbf{107}_j$ may also move goods from a producer, manufacturer, or manufacturing line to warehouse $\mathbf{105}_i$. Vehicle $\mathbf{107}_j$ may include one or more vehicles. Each vehicle $\mathbf{107}_j$ can be any vehicle configured for goods movement, including non-exhaustively trucks, cars, trains, rolling stock, planes, helicopters, boats, ships, barges, rafts, drones, robots, conveyors, or a river or current motivating goods by streamflow; and vehicle $\mathbf{107}_j$ may be operated locally, remotely, autonomously, or semi-autonomously-when operated non-locally, vehicle $\mathbf{107}_j$ may be operated from any location, including a warehouse $\mathbf{105}_i$ or a retail facility $\mathbf{110}_n$. When operated autonomously or semi-autonomously, vehicle $\mathbf{107}_j$ may be operated by, or may have operation informed by, management server 120.

Warehouse loading 106 personnel include people or equipment retained for the purpose of moving goods within warehouse 105. Warehouse loading 106 personnel may include one or more entities, who may work in shifts, or work at a warehouse $\mathbf{105}_i$ in concert, depending upon the complexity of warehouse $\mathbf{105}_i$. Warehouse loading 106 personnel can include human personnel, who may use equipment such as pallet trucks, forklifts, stackers, pallet jacks, shipping containers, carts, conveyors, elevators, or wheeled tubs or containers to facilitate movement of goods within a warehouse $\mathbf{105}_i$. Warehouse loading 106 personnel can also include robots, which may be operated remotely, autonomously, semi-autonomously, or as an assistant to a human in order to move goods within a warehouse $\mathbf{105}_i$.

Driver 108 personnel include people or equipment retained for the purpose of operating a vehicle $\mathbf{107}_j$. Each vehicle $\mathbf{107}_j$ can include one or more driver 108 personnel, who may work in shifts, or work vehicle $\mathbf{107}_j$ in concert, depending upon the complexity of vehicle $\mathbf{107}_j$. Driver 108 personnel may assist on-site loading 114 personnel, warehouse loading 106 personnel, or scanner $\mathbf{113}_q$ personnel in facilitating their respective tasks.

Each retail facility $\mathbf{110}_n$ resides at an on-site location $\mathbf{115}_m$. Each on-site location $\mathbf{115}_m$ includes the area in which goods are stored for selection by or to retail customers. Each on-site location $\mathbf{115}_m$ may also include the entire premises of a retail facility $\mathbf{110}_n$, and may include any bay of a retail facility $\mathbf{110}_n$, or any storage facilities of a retail facility $\mathbf{110}_n$, approximating the functionality of a warehouse like warehouse 105. Each on-site location $\mathbf{115}_m$ may also include a two-dimensional area or three dimensional volume surrounding a retail facility $\mathbf{110}_n$, which may include grounds, campus, parking lots or structures, ports, quays, runways, hangars, roads, rail sidings or lines, rolling stock, shipping containers, terminals, stockpiles, fences, walls, or roads of a retail facility $\mathbf{110}_n$.

Scanner $113_q$ personnel include people or equipment retained for the purpose of auditing current quantities of goods provisioned by a warehouse $105_i$ at a retail facility $110_n$. Scanner $113_q$ personnel operate on-site $115_m$ when counting or auditing the quantities of relevant goods at a retail facility $110_n$. Scanner $113_q$ personnel may include one or more entities, who may work in shifts, or work on-site $115_m$ in concert, depending upon the complexity of retail facility $110_n$. Scanner $113_q$ personnel can include human personnel, who may use equipment such as cameras, computers which may implement computer vision software, optical scanners, fiber optic sensors, lasers, radio frequency scanners or readers, nonvisible-spectrum scanners, impedance scanners, weight or mass sensors, thermometers, luminescence sensors, lumen meters, or the like to audit goods on-site $115_m$. Scanner $113_q$ personnel can also include robots, which may be operated remotely, autonomously, semi-autonomously, or as an assistant to a human in order to audit goods on-site $115_m$.

Salesperson 112 personnel include people or equipment retained for the purpose of deploying and organizing marketing materials on-site $115_m$, revising pricing of goods at a retail facility $110_n$, and maintaining and improving the relationship between a retail facility $110_n$, and retailer 111 in order to increase sales efficiency at a retail facility $110_n$. Salesperson 112 personnel may include one or more entities, who may work in shifts, or work on-site $115_m$ in concert, depending upon the complexity of retail facility $110_n$. Salesperson 112 personnel also may finalize and submit orders to be fulfilled at the warehouse by warehouse loading 106 personnel. Increasing sales efficiency can include increasing quantity of relevant goods stocked at retail facility $110_n$, increasing variety of relevant goods stocked at retail facility $110_n$, increasing shelf space or real estate within retail facility $110_n$ dedicated to relevant goods, increasing the price on relevant goods in order to increase profitability on relevant goods, decreasing the price on relevant goods in order to increase sales velocity of relevant goods, increasing advertising space on-site $115_m$ dedicated to relevant goods, relocating relevant goods to higher-traffic areas, increasing ordering autonomy of the salesperson 112 personnel relative to retail facility $110_n$, and other traditional sales and marketing strategies for improving profitability on goods sold via retailers.

Figure 4:
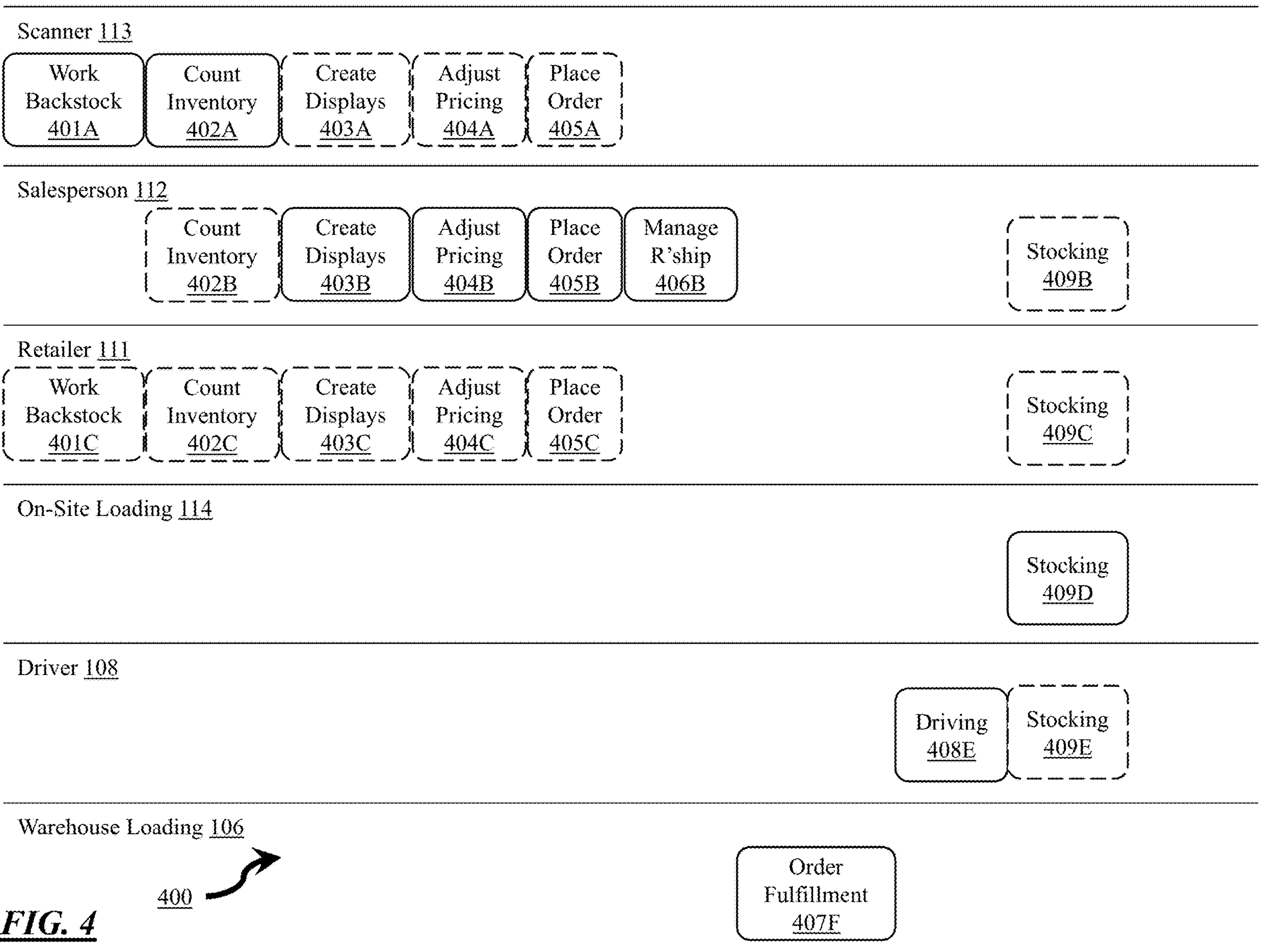
FIG. 4 is a swimlane process flow diagram depicting exemplary steps taken by direct agents to efficiently deploy products.

Warehouse loading 106, driver 108, retailer 111, salesperson 112, scanner 113, and on-site loading 114 can all constitute direct agents in the efficient product deployment paradigm 100. While in this disclosure particular direct agents 106, 108, 111-114 have purposeful tasks assigned based on their role, in some implementations, any direct agent 106, 108, 111-114 may perform any task assigned to any other direct agent. FIG. 4, discussed further below, shows an implementation where a single task (e.g., count inventory 402A-C) can be performed by a number of agents, with a preference for a particular agent (e.g., scanner 113) to perform that particular task (e.g., count inventory 402A). However, role assignments are not limited to the chart depicted in FIG. 4: for example, a driver 108 could conceivably perform every task in the efficient product deployment paradigm 100—an example of such a scenario could be a product deployment paradigm across multiple vending machines: a single person (e.g., driver 108) would perform all audits, ordering, driving, stocking, pricing, and relationship development with retail facility $110_n$. As such, the labels of driver 108 as compared to, for example, salesperson 112, are only consequential in reference to another entity performing different tasks in the efficient product deployment paradigm 100: a single entity performing all of the tasks in the efficient product deployment paradigm 100 could be identified as any or all of the direct agent 106, 108, 111-114.

Management server 120, discussed in further detail below, implements the dynamic assessment, organization, and reconciliation protocol 300 (see FIG. 3) utilized to facilitate the efficient product deployment paradigm 100. Management server 120 receives inputs (e.g., on-site scanned data 304, vehicle telemetry 308, warehouse data 310 from FIG. 3) from the various direct agents 106, 108, 111-114 in order to provide forward deployment 346 of on-site direct agents 111-114, goods groupings 348 to warehouse loading 106 personnel, routing information 352 to drivers 108, and delivery strategies to on-site loading 114 personnel.

Goods, in particular relevant goods, in some implementations are non-durable goods. Non-durable goods in particular require an efficient product deployment paradigm 100, as the non-durable goods need to be deployed from warehouse $105_i$ as soon as retail facility $110_n$ has capacity to stock these non-durable goods, in order to maximize sales and shelf life of the non-durable goods. Additionally, non-durable goods which have expired on the shelf of retail facility $110_n$ often must be returned or removed from on-site $115_m$ by the producer, manufacturer, manufacturing line, or warehouse $105_i$, and further at the expense of the producer, manufacturer, manufacturing line, or warehouse $105_i$: thus incentivizing warehouse $105_i$ and vehicle $107_j$ to receive maximally-efficient instructions from management server 120.

Goods, including the relevant goods, are often tracked as and by stock-keeping units (SKUs). In particular, if the relevant goods are fungible goods, as opposed to specifically-identified goods, tracking a quantity of that relevant good in association with the SKU related to that good is generally a sufficient method for tracking the population of the relevant good at a certain area. In some examples, in particular for certain non-durable goods, tracking of the relevant goods may include tracking a quantity of SKUs as well as the expiration dates of those SKUs at a certain area to more accurately track the population (e.g., 0-36000-29145-2, a universal product code (UPC) SKU, may be associated with a count of product expiring in one week at retail facility $110_n$, a separate count of product expiring in two weeks at retail facility $110_n$, a separate count of product expiring in three weeks at retail facility $110_n$, etc.)

Figure 2:
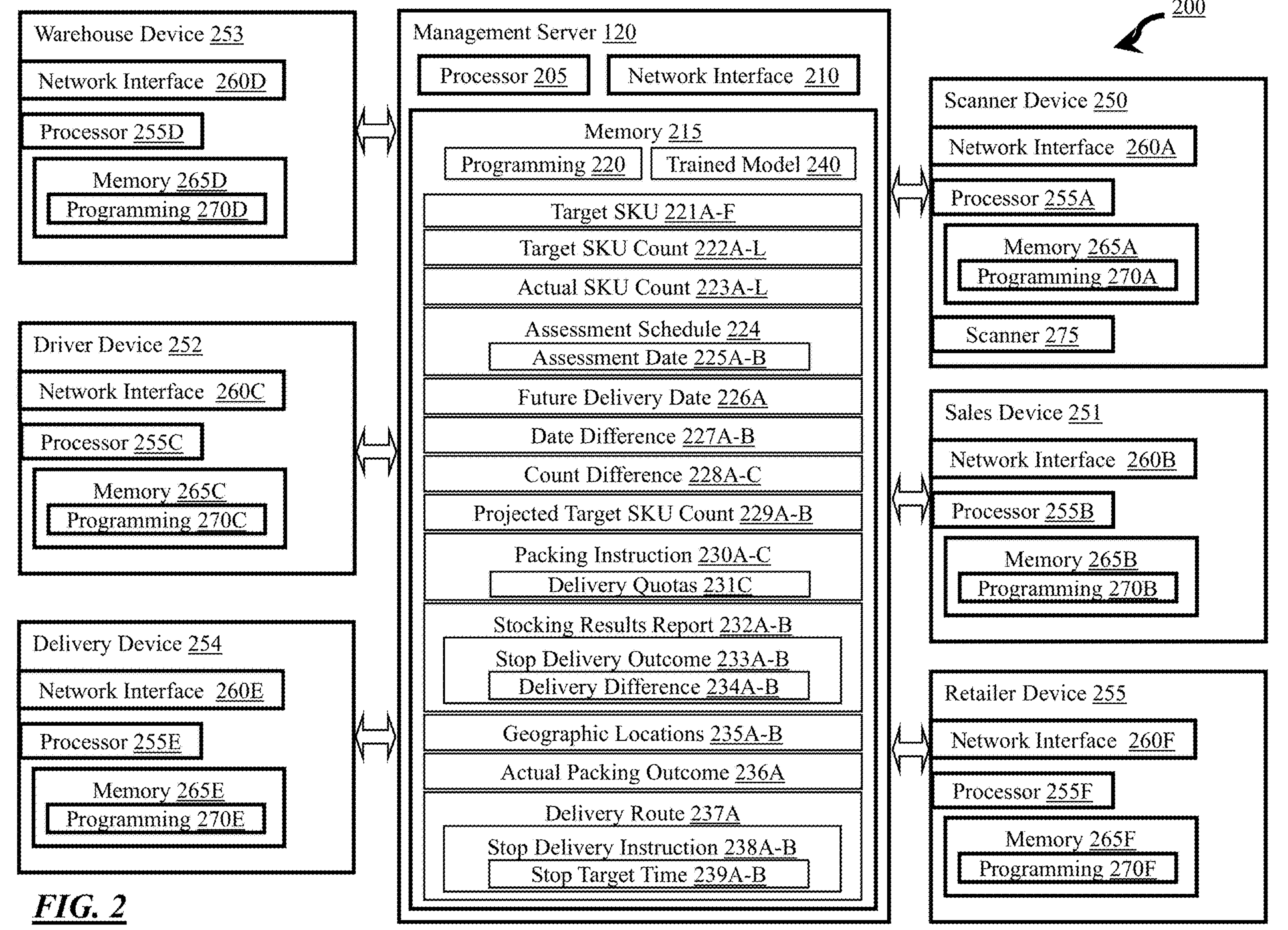
FIG. 2 is an exemplary high-level functional block diagram of an example of a dynamic assessment, deployment, and reconciliation system, including a management server and several connected devices.

FIG. 2 is an exemplary high-level functional block diagram of an example of a dynamic assessment, deployment, and reconciliation system 200, including a management server 120 and several connected devices 250-255.

The example management server 120 will generally be described as an implementation of a server platform or host type computer, e.g. as might be configured as a blade device in a server farm or in network room of a particular premises. Alternatively, the management server 120 may comprise a mainframe or other type of back end server system capable of web-based communications, media content distribution, or the like via a network. The management server 120 includes a processor 205 formed of one or more subprocessors and a memory 215. The circuitry forming the processor 205 may include a single microprocessor, the circuitry forming the processor 205 may include a number of microprocessors for configuring the management server 120 as a multi-processor system, or the circuitry forming the processor 205 may use a higher speed processing architecture. The memory 215 in the example includes ROM, RAM and cache memory; although other memory devices may be added or substituted, including magnetic type devices (tape or disk) and optical disk devices that may be used to provide higher volume storage.

The management server 120 runs a variety of applications programs, and stores and processes various information in a database or the like for facilitating the efficient product deployment paradigm 100 via the devices 250-255 connected to the network interface 210. In operation, the memory 215 stores instructions and data for execution by the processor 205. The management server includes a network interface for data communications with the device 250-255, either directly or over a network.

Although not shown, the computer platform configured as the management server 120 may further include appropriate input/output ports for interconnection with a local display and a keyboard and mouse or with a touchscreen or the like, serving as a local user interface for configuration, programming or trouble-shooting purposes. Alternatively, system operations personnel may interact with the computer system of the management server 120 for control and programming of the dynamic assessment, deployment, and reconciliation system 200 from a remote terminal device via the Internet or some other link via any network. The functions of the management server 120 may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the management server 120 generally are conventional in nature, and it is presumed that those skilled in the art are sufficiently familiar therewith to understand implementation of the present system and associated lighting control technique using suitable configuration and/or programming of such computer platform(s) based on the description above and the accompanying drawings.

The memory 215 stores various objects and values required to implement the dynamic assessment, organization, and reconciliation protocol 300. The memory stores the target SKUs 221A-F—each target SKU is representative of a product stored in warehouse $\mathbf{105}_i$ and stocked at one or more retail facilities $\mathbf{110}_n$. In this example, there are six SKUs stocked at two retail facilities $\mathbf{110}_{na\text{-}nb}$ in one geographic location 235A; however, any number of SKUs 221A-F, retail facilities $\mathbf{110}_n$, geographic locations 235A, delivery routes 237A, and associated memory structures 221-239 are contemplated.

For each retailer, a target SKU count 222A-L is tracked for each target SKU 221A-F: therefore, for example, two retail facilities $\mathbf{110}_{na\text{-}nb}$ and six target SKUs 221A-F result in twelve target SKU counts 222A-L. A target SKU count 222A represents the target quantity of a particular target SKU 221A that should be present at a given retail facility $\mathbf{110}_n$ immediately after delivery and stocking of the retail facility $\mathbf{110}_n$ for that SKU 221A. Generally, the target SKU count 222A may represent the shelf space allocated to the particular target SKU 221A at the respective retail facility $\mathbf{110}_n$ and, in some circumstances, additional backstock to be stored on-site $\mathbf{115}_m$ with the respective retail facility $\mathbf{110}_n$.

The target SKU 221A-F and target SKU count 221A-F for a given retail facility $\mathbf{110}_n$ can be sent to the scanner device 250 via the network interface 210, 260A to facilitate the scanner 113 in auditing goods on-site $\mathbf{115}_m$. Each scanner device 250 is a computing device, which can be handheld like, for example, a specialized barcode scanner device or a mobile device with programming 270A installed in the memory 265A and executed by the processor 255A of the scanner device 250 for communicating with the management server 120 and auditing relevant goods at retail facilities $\mathbf{110}_n$. Scanner device 250 may be used by scanner 113 personnel to return an actual SKU count 223A for a target SKU 221A at a retail facility $\mathbf{110}_n$. Having the target SKU 221A or the target SKU count 222A may assist the scanner 113 personnel in identifying what goods are relevant goods, and whether their count is reasonably accurate.

In various embodiments, the scanner 113 personnel using the scanner device 250 submit their actual SKU count 223A-F for the target SKUs 221A-F at a retail facility $\mathbf{110}_{na}$ via the scanner device 250 to the management server 120. The date upon which the actual SKU count 223A-F was collected may be recorded in memory 215 as the assessment date 225A. In various embodiments, the scanner 113 personnel, using the same or a different scanner device, may scan the same target SKUs 221A-F at a different retail facility $\mathbf{110}_{nb}$ to determine target SKU counts 221G-L for those target SKUs 221A-F at that retail facility $\mathbf{110}_{nb}$. The second set of target SKU counts 221G-L may have the same assessment date 225B as the first assessment date 225A, or a different assessment date 225B. Assessments may be tracked on an assessment schedule 224, which can be propagated to scanner devices 250. Alternatively, management server 120 can review the assessment schedule 224, and send a particular assessment task to particular scanner 113 personnel.

In various embodiments, the memory 215 also stores future delivery date 226A. Generally, though actual SKU counts 223A-L can be made on different days, for the purposes of scheduling (and not for the purposes of training the trained model 240), generally, the SKU counts 223A-L may be grouped by future delivery date 226A—as one of the purposes of the dynamic assessment, organization, and reconciliation protocol 300 is to make deliveries as efficient as possible, deliveries scheduled for different dates generally do not impact one another, and are generally not grouped together for the purposes of preparing packing instructions 230A-C or delivery routes 237A. However, it is contemplated that deliveries could span multiple days for a given vehicle $\mathbf{107}_j$, and, as such, the concept of delivery date can be broadened to a delivery period of time wherein the vehicle $\mathbf{107}_j$ is not scheduled, before leaving warehouse $\mathbf{105}_i$, to return to warehouse $\mathbf{105}_i$ for substantive repacking.

In various embodiments, the management server 120 calculates and stores a date difference 227A-B, representing the respective difference between each assessment date 225A-B and their respective future delivery date 226A. These dates may vary due to the assessment schedule 224. For example, a first retail facility $\mathbf{110}_{na}$ may have an assessment date 225A of Monday, for a future delivery date 226A of Friday, resulting in a four-day date difference 227A relevant to the target SKU 221A at that first retail facility $\mathbf{110}_{na}$. A second retail facility $\mathbf{110}_{nb}$ may have an assessment date 225B of Wednesday, resulting in a two-day date difference 227B relevant to target SKU 221A at that second retail facility $\mathbf{110}_{nb}$.

Likewise, in various embodiments, the management server 120 may also calculate and store a count difference 228A-B representing the respective difference between the target SKU count 222A,G and their respective actual SKU count 223A,G. These values may vary due to total capacity differences between the different retail facilities $\mathbf{110}_n$, and the rate of sale of the relevant good at those different retail facilities $\mathbf{110}_n$. For example, a first retail facility $\mathbf{110}_{na}$ may have a target SKU count 222A or capacity of one thousand units of the relevant good, and may only have an actual SKU count 223A of six hundred units of the relevant good actually available and stocked, resulting in a four-hundred unit count difference 228A. A second retail facility $\mathbf{110}_{nb}$ may have a target SKU count 222G of five hundred units of the relevant good, and may only have an actual SKU count 223G of two hundred units of the relevant good, resulting in a three-hundred unit count difference 228G.

In various embodiments, the management server 120 may feed the target SKUs 221A-F, the date difference 227A-B, and the count differences 228A-B into trained model 240, in order to produce projected target SKU counts 229A-B. In various embodiments, the trained model is trained and validated based on prior target SKU counts 222A-L, prior actual SKU counts 223A-L, prior date differences 227A-B, prior count differences 228A-B, prior projected target SKU counts 229A-B, prior stocking results reports 232A-B, prior actual packing outcomes 236A, and prior delivery routes 237A, or simulated versions of the same data, in order to project the amount of change between the count difference 228A from the assessment date 225A and the actual capacity for the target SKU 221A at a retail facility $\mathbf{110}_n$ on the future delivery date 226A. In various embodiments, the trained model 240 practically implements the concepts of sales velocity and sell-through rate, in order to determine how much stock of a retailer good at a retail facility $\mathbf{110}_n$ has likely changed between an assessment date 225A and a future delivery date 226A, and produces that value as the projected target SKU count 229A-B.

In various embodiments, the management server 120 uses the projected target SKU counts 229A-B to produce packing instructions 230A-B. Packing instructions 230A-B may be instructions to warehouse loading 106 personnel aiding those warehouse loading 106 personnel in loading proper quantities of relevant goods onto vehicle $\mathbf{107}_j$. Packing instructions 230A-B may be as simple as a list of quantities of relevant goods. Packing instructions 230A-B may leverage other data sources (and trained model 240 may utilize those same sources in preparing the projected target SKU counts 229A-B) in order to set a picking timespan or deadline for the warehouse loading 106 personnel (e.g., a batch must be loaded onto a vehicle $\mathbf{107}_j$ by 8:00 AM), to provide general or detailed instructions on where the relevant goods are located in warehouse $\mathbf{105}_i$, to provide a preferred or mandatory sequence for retrieving or picking goods in warehouse $\mathbf{105}_i$ for loading into a vehicle $\mathbf{107}_j$, to provide a preferred or mandatory sequence for loading picked goods into a vehicle $\mathbf{107}_j$ (e.g., divided by retail facility $\mathbf{110}_n$, delivery order, temperature requirements, load-balancing within vehicle $\mathbf{107}_j$ requirements, projected or actual availability of on-site loading 114 personnel at retail facilities 110), to provide particular warehouse loading 106 personnel to pick and/or load particular relevant goods onto particular vehicles $\mathbf{107}_j$, including loading an example first relevant good onto both an example first vehicle $\mathbf{107}_{ja}$ as well as an example second vehicle $\mathbf{107}_{jb}$, to provide delay time and/or a staging area for storing relevant goods between picking an order and loading an order, or a combination thereof.

In some examples, packing instructions 230C may be instructing a packing of at least one vehicle $\mathbf{107}_j$ intending to visit multiple retail facilities $\mathbf{110}_n$. In such examples, and in particular when the relevant good(s) are a relatively fungible good, the packing instruction 230C may further include a delivery quota 231C primarily for the driver 108 or the on-site loading 114 personnel. The delivery quota 231C may indicate a particular quantity of a relevant product to deliver to each retail facility $\mathbf{110}_n$. Generally, and in various embodiments, when delivering to multiple retail facilities $\mathbf{110}_n$, each group of goods for each respective retailer will be grouped together, and potentially palletized. However, when the respective goods are fungible, and of relatively low variety within an order, it may be more efficient to simply provide drop-off quantities. Rather than unloading a first pallet at a first retail facility $\mathbf{110}_{na}$, and a second and third pallet at a second retail facility $\mathbf{110}_{nb}$, delivery quota 231C may instead indicate to unload thirty of a first relevant good, twenty of a second relevant good, and five of a third relevant good at a first retail facility $\mathbf{110}_{na}$; then the delivery quota 231C may further indicate unloading sixty of the first relevant good, forty of the second relevant good, and then of the third relevant good at a second retail facility $\mathbf{110}_{nb}$.

Delivery quotas 231C may also provide an advantage in that delivery of relevant goods may be adapted during a delivery route to account for incorrect predictions by the trained model 240. For example, assume a vehicle $\mathbf{107}_j$ only has capacity for two hundred relevant goods, and that the first relevant good, second relevant goods, and third relevant good are all of the same size and weight, such that vehicle $\mathbf{107}_j$ could accommodate any combination of first relevant good, second relevant goods, and third relevant good up to two hundred total goods. Trained model 240 may project that, for example, a first retail facility $\mathbf{110}_{na}$ has need of forty units of the first relevant good, twenty units of the second relevant goods, and ten units of the third relevant good, totaling seventy units; a second retail facility $\mathbf{110}_{nb}$ has need of eighty units of the first relevant good, forty units of the second relevant goods, and twenty units of the third relevant good, totaling one-hundred-and-forty units for the second retail facility $\mathbf{110}_{nb}$, and two-hundred-and-ten units for the combined order across the first retail facility $\mathbf{110}_{na}$ and the second retail facility $\mathbf{110}_{nb}$. Trained model 240 may determine, based on external data, that, for example, the first relevant good is the least profitable relevant good of the three relevant goods, and that the profit generated by selling an additional ten units of first relevant good does not overcome the additional cost of splitting the entire two-hundred-and-ten unit order into two or more orders across multiple vehicles $\mathbf{107}_{ja\text{-}jn}$. Therefore, trained model 240 produces packing instructions 230C specifying one-hundred-and-ten units of the first relevant good, sixty units of the second relevant goods, and thirty units of the third relevant good, totally two-hundred units, which will fit in a single vehicle $\mathbf{107}_j$. Trained model 240 and management server 120 may use any criteria or process to divide, delay, restructure, or truncate any projected target SKU count 229A-B or packing instruction 230A-C.

In various embodiments, once vehicle $\mathbf{107}_j$ is loaded in conformity with the packing instructions 230C, vehicle $\mathbf{107}_j$ makes a scheduled delivery to a first retail facility $\mathbf{110}_{na}$. Upon arriving, it may be determined that, for example, the first retail facility $\mathbf{110}_{na}$ only has capacity for thirty-five units of the first relevant good, fifteen units of the second relevant goods, but fifteen units of the third relevant good. The on-site loading 114 personnel can then unload those quantities (in some examples, fifteen units of the third relevant good will be unloaded to match capacity; in this example, ten units of the third relevant good will be unloaded to match the packing instructions 230C; in still other examples a hybrid approach is used, or a new delivery quota 231C is generated based on the actual SKU counts 223A-B on-site to instruct the on-site loading 114 personnel.) The first retail facility $\mathbf{110}_{na}$ is either fully stocked, or is stocked based upon the packing instructions 230C, or based on the initial or a revised delivery quota 231A.

In various embodiments, a vehicle $\mathbf{107}_j$ may then proceed to make a scheduled delivery to a second retail facility $\mathbf{110}_{nb}$. Upon arriving, it may be determined that, for example, the second retailer has capacity for ninety units of the first relevant good, fifty units of the second relevant goods, and twenty units of the third relevant good. Because the vehicle $\mathbf{107}_j$ retained the overstock of the first and second relevant goods, the vehicle may be able to deliver for example, eighty-five units of the first relevant good, forty-five units of the second relevant goods, and twenty units of the third relevant good.

If both orders were separately palletized and could not be combined, the first order would have been 92% of what the first retail facility $\mathbf{110}_{na}$ could accommodate: the first and second relevant goods were overstocked (and so would go back to the warehouse 105) and the third relevant good was understocked, resulting in sixty of sixty-five relevant goods required actually being delivered to the first retailer. Similarly, only seventy of the relevant first good, forty of the relevant second good, and twenty of the third relevant good would have been delivered to the second retail facility $\mathbf{110}_{nb}$, resulting in a shortfall (though partially expected due to the truck being under-packed by ten of the first relevant good) and only 81% of the relevant goods required being actually delivered.

However, by using delivery quota 231C, the overstock from the first retail facility $\mathbf{110}_{na}$ may be efficiently-applied to the second retailer: delivery of, for example, five more of the first relevant good and five more of the second relevant good, and improving the satisfaction rate from 81% to 88%. Further, if the third relevant good had been fully stocked at the first retail facility $\mathbf{110}_{na}$, the first retailer would have a 100% satisfaction rate, while the second retailer would have 84%, which is still higher than the palletized 81% rate. These improvements to satisfaction rate would cascade as vehicle $\mathbf{107}_j$ has more stops with variation in actual SKU counts 223A-B as compared to projected target SKU counts 229A-B, and at scale with, for example, a number of vehicles $\mathbf{107}_j$. Alternatively, preferred vendors, or higher-profit vendors, may see higher satisfaction rates at the expense of less-preferred vendors. Additionally, the end of the route might include an "anchor store" which may be a retail wholesaler or a big box store with a relatively massive capacity for relevant goods: a route may make deliveries to multiple retail facilities $\mathbf{110}_n$ along a route, and ultimately be instructed to deliver the residual relevant goods to the anchor store, under the assumption that the anchor store has capacity. The anchor store may be offered a lower per-product price or preferred delivery terms in exchange for operating in this anchor store capacity. Multiple vehicles $\mathbf{107}_{ja\text{-}jn}$ on routes may have their routes terminate at the same anchor store. The anchor store may also be serviced by its own route and a vehicle $\mathbf{107}_j$, designed to transport relevant goods that the anchor store has capacity for, which for whatever reasons do not end up as residual goods on the routes of other vehicles $\mathbf{107}_j$ whose routes terminate at the anchor store.

The packing instructions 230A-C and/or delivery quotas 231C can be provisioned to the driver device 252 and/or the delivery device 254 to facilitate the driver 108 personnel and the on-site loading 114 personnel in fulfilling orders on-site $\mathbf{115}_m$ for a retail facility $\mathbf{110}_n$.

In various embodiments, when a delivery is completed, a stocking results report 232A-B may be generated—this report may indicate what relevant goods were actually delivered in what quantities to retail facilities $\mathbf{110}_n$. The stocking results report 232A-B may facilitate tuning inputs and presumptions provided into trained model 240, and/or may facilitate re-training trained model 240. Trained model 240 can be tuned or trained to be more accurate in determining the projected target SKU count 229A-B. Trained model 240 can also be tuned or trained to hit alternative criteria, and can be tuned to do so at the level of the individual retail facility $\mathbf{110}_n$ and the future delivery date 226A. For example, trained model 240 can be trained to provide a 95% confidence interval that a given delivered relevant good will not be under-delivered—which would likely result in some relatively higher probability of over-delivering 95% of deliveries. Trained model 240 could also do the alternative, and provide a 90% confidence interval that a given delivered relevant good will not be over-delivered—which would likely result in some relatively higher probability of under-delivering 90% of deliveries. Trained model 240 may also be tuned based on the relevant good, retail facility $\mathbf{110}_n$, and future delivery date 226A: for example, in general trained models 240 may instruct an as-accurate-as-possible projected target SKU count 229 for whole turkey to a grocery store. However, for example, in the month of November prior to the fourth Thursday of the month, the trained model 240 may be tuned to provide a 99% confidence interval that whole turkey will not be under-delivered to grocery store retail facilities $\mathbf{110}_n$. The trained model 240 may have knowledge that, for example, the fourth Thursday of November is Thanksgiving day in the U.S., or the trained model 240 may determine that whole turkeys are very difficult to keep in stock in the month of November prior to the fourth Thursday of the month as an emergent property of input training data provided to trained model 240, and compensate by ensuring whole turkey is in stock, at the risk of returning whole turkey to the warehouse $\mathbf{105}_i$ at the end of a delivery by vehicle $\mathbf{107}_j$.

The stocking results report 232A-B may have additional detail stored as a stop delivery outcome 233A-B, which may be a stop-level or retailer-level stocking report: this detail may allow the trained model 240 the level of granularity to improve the trained model on a per-retail facility $\mathbf{110}_n$ basis. For example, it is possible that, at the stocking results report level 232A, the report indicates a 100% satisfaction rate: all goods were delivered, and no retail facility $\mathbf{110}_n$ was left with additional capacity. However, at the stop delivery outcome 233A-B, it is possible that the first retailer was materially over-projected; but the second retailer was materially under-projected, cancelling out the difference: the first retail facility $\mathbf{110}_{na}$ may have been sent one hundred relevant goods, but only had actual capacity for ten; however, the second retail facility $\mathbf{110}_{nb}$, who was also sent one hundred relevant goods, had actual capacity for one-hundred-and-ninety relevant goods: a perfect overall delivery, with individual retail facility 110 projections off by 900% and 90%, respectively. These individual differences between the individual retailer's projected target SKU count 229A-B and the stop delivery outcome 233A-B may be maintained as a delivery difference 234A-B.

In various embodiments, the management server 120 may also store geographic locations 235A-B. A geographic location 235A-B may generally be an area in which one or more retail facilities $\mathbf{110}_n$ can be serviced by a single vehicle $\mathbf{107}_j$. Therefore, a geographic location 235A generally includes at least one warehouse $\mathbf{105}_i$, and at least one retail facility $\mathbf{110}_n$. Geographic locations 235A-B may overlap, and may be non-contiguous (e.g., deliveries by air or sea: multiple airports could be serviced by a single airplane vehicle $107_j$, but those airports are not physically contiguous with one another: an airplane may be able to service Newark Liberty National Airport and John F. Kennedy National Airport, but not Times Square in Manhattan.) A geographic location 235A could include transfers between vehicles $107_j$, in particular mixed-mode transfers, or consolidating transfers e.g., a first truck and a second truck both deliver to a large retail facility $110_n$, then load some residual stock from the first truck into the second truck, and other residual stock from the second truck to the first truck: the trucks then separately continue on separate routes, or back to one or more warehouses $105_i$.

In various embodiments, the management server 120 can also store an actual packing outcome 236A. The actual packing outcome 236A may describe the quantities of relevant goods actually loaded onto a vehicle $107_j$. The actual packing outcome 236A may differ from the packing instruction 230A due to lack of supply at the warehouse $105_i$, or lack of capacity within a vehicle $107_j$. Actual packing outcome 236A may also include the layout of the relevant goods packed, like a planogram, to facilitate efficient stocking by the on-site loading 114 personnel. The actual packing outcome 236A may be used as input for the training model 240: the training model 240 may not be aware of differences between specified capacity and actual capacity of certain vehicles $107_j$ (e.g., a truck may accommodate nine-hundred-and-fifty cubic feet of relevant goods, but based on the dimensions of the truck, including particularities of a particular truck, the actual capacity might be less than nine-hundred-and-fifty cubic feet. Alternatively, training model 240 may be informed that relevant product is one cubic foot, and conclude nine-hundred-and-fifty units of the relevant product can be loaded-however, due to the particularities, including stacking particularities, the truck may be able to accommodate less or more units of the relevant product: even if a basketball is specified as one cubic foot, more than nine-hundred-and-fifty can fit in nine-hundred-and-fifty cubic feet due to the spheroid nature of the basketballs.

In various embodiments, the management server 120 can further store delivery route 237A. A delivery route 237A may be produced and provided to a vehicle $107_j$ (in some examples via the driver device 252) in order to inform driver 108 personnel of each retail facility $110_n$ in the geographic location 235A serviced by that vehicle $107_j$ which is to be visited on that delivery date 226A. The delivery route 237A can include a stop delivery instruction 238A-B, which provides specific instructions to the driver 108 personnel regarding where deliveries are to be made, and provides instruction to on-site loading 114 personnel regarding which relevant goods in what quantities are to be stocked on-site $115_m$ from a vehicle $107_j$ to a retail facility $110_n$. The stop delivery instructions 238B can also be issued or re-issued after a first or prior stop, based on delivery differences 234A-B being provided to the trained model 240, and the trained model determining a more efficient next delivery instruction: either a change in delivery quantities, or a change in next delivery destination. The stop delivery instructions 238B be issued or re-issued after a first or prior stop can also use external data, such as traffic or weather data, to re-order or re-structure the delivery quotas 231C or the delivery route 237A.

Stop delivery instructions 238A-B can also include stop target times 239A-B, which indicate to driver 108 personnel when to reach the on-site $115_m$ location for delivery. The stop target times 239A-B may also be given to the on-site loading 114 personnel.

Therefore, FIGS. 1-2 depict an exemplary dynamic assessment, deployment and reconciliation system 200 of a plurality of different, non-durable stock-keeping units (SKUs) for a plurality of different retail facilities $110_n$ in a plurality of different geographic locations 235A-B. The system 200 includes a processor 205, a network interface 210 configured for data communication over a network and coupled to the processor 205, and a memory 215 coupled to the processor 205. The system 200 also includes programming 220 in the memory 215, wherein execution of the programming 220 by the processor 205 configures the system 200 to implement functions. The following functions, for each of a plurality of different target SKUs 221A-F for different, non-durable SKUs, are periodically implemented. The system 200 receives a target SKU count input 222A of the target SKU 221A. Over the network interface 210, the system 200 receives an actual SKU count input 223A of the target SKU 221A on an assessment date 225A. The system 200, determines a future delivery date 226A, the future delivery date 226A later than the assessment date 225A. The system 200 calculates a date difference 227A, the date difference 227A based on a difference between the assessment date 225A and the future delivery date 226A. The system 200 calculates a count difference 228A, the count difference 228A based on a difference between the target SKU count input 222A and the actual SKU count input 223A. The system 200 simulates, using a trained model 240, an effect of time on a quantity of target SKU 221A required for delivery, using the date difference 227A and the count difference 228A, to determine a projected target SKU count 229A. Based on the projected target SKU count 229A, system 200 issues a packing instruction 230A, the packing instruction 230A configured to instruct a packing of the target SKU 221A onto a transportation vehicle $107_j$ at a dynamically selected intermediate facility (e.g., a warehouse $105_i$.)

In some examples, the trained model 240 may be periodically trained based on a training data set, and the training data set may include at least one data point wherein a data point date difference 227B of the data point is greater or lesser than the date difference 227A. For example, the training set may have been trained on collected data where a scanner device 250 collected actual SKU counts 223B on a Tuesday for a Friday delivery, resulting in that data point having a three-day date difference 227B. However, in that example, the actual SKU count 223A for which the trained model 240 is attempting to derive a projected target SKU count 229A may be taken on a Monday for a Friday delivery, resulting in a four-day date difference 227A, which is greater than the date difference 222B.

In some examples, the system 200 is configured by the execution of the programming 220 to implement the following functions. The system 200 receives a stocking results report 232A, where the stocking results report 232A describes a difference between the projected target SKU count 229A and an actual SKU quantity delivered. The system 200 re-trains the trained model 240 based on the stocking results report 232A.

In some examples, the functions implemented by executing programming 220 are further periodically implemented for each of a plurality of different retail facilities $110_n$ in each of a plurality of different geographic locations 235A-B.

In some examples, execution of the programming 220 by the processor 205 further configures the system 200 to implement functions. The following functions, for each of a plurality of different target SKUs 221A-F for different, non-durable SKUs, are periodically implemented. The system 200, over the network interface 210, for each of a plurality of different retail facilities $\mathbf{110}_n$ in the same geographical area 235A, receive a respective actual SKU count input 223A,G of the target SKU 221A on a respective assessment date 225A. The count difference 228A is further based on a difference between the target SKU count 222A,G and a sum of the respective actual SKU count inputs 223A,G of the target SKU 221A. The packing instruction 230A further includes respective delivery quotas 231C associated with each of the respective actual SKU count inputs 223A,G of the target SKU 221A.

In some examples, the system 200 is configured by the execution of the programming 220 to implement one or more of the following functions periodically. The system 200, based on an actual packing outcome 236A of a transportation vehicle $\mathbf{107}_j$ at a dynamically selected intermediate facility $\mathbf{105}_i$, issues a first stop delivery instruction 238A, the first stop delivery instruction 238A including a first retail facility $\mathbf{110}_{na}$ of a plurality of different retail facilities $\mathbf{110}_n$ in the same geographical area 235A, and a first delivery amount of the target SKU 221A. The first delivery amount of the target SKU 221A can be the projected target SKU count 229A, and the actual SKU count input 223A is captured at the first retail facility $\mathbf{110}_{na}$ of the plurality of different retail facilities $\mathbf{110}_n$ in the same geographical area 235A on the assessment date 225A. The execution of the programming 220 can implement the following functions periodically. The system 200 can receive a first stop delivery outcome 233A, the first stop delivery outcome 233A reporting a first delivered amount of the target SKU 221A differing from the first delivery amount as a first delivery difference 234A. The system 200 can simulate, using the trained model 240, an effect of the first delivery difference 234A on a quantity of the target SKU 221A required for delivery to a second retail facility $\mathbf{110}_{nb}$ of the plurality of different retail facilities $\mathbf{110}_n$ in the same geographical area 235A, to dynamically determine an updated quantity of the target required for delivery to the second retail facility $\mathbf{110}_{nb}$. The first delivery amount of the target SKU 221A, and the quantity of the target SKU required for delivery to the second retail facility $\mathbf{110}_{nb}$ of the plurality of different retail facilities $\mathbf{110}_n$ in the same geographical area 235A, can be dynamically determined before the packing instruction 230A is issued. The assessment date 225A can be on an assessment schedule 224, and execution of the programming 220 by the processor 205 can further configure the system 200 to implement the following functions periodically. The system 200 can simulate, using the trained model 240, an effect of the first delivery difference 234A on the assessment schedule 224, to determine an updated assessment schedule 224.

In some examples, the system 200 may be configured by the execution of the programming 220 to implement one or more of the following functions periodically. The system issues a first stop delivery instruction 238A, the first stop delivery instruction 238A including a first retail facility $\mathbf{110}_{na}$ of a plurality of different retail facilities $\mathbf{110}_n$ in the same geographical area 235A, and a first delivery amount of the target SKU 221A. The system 200 issues a second stop delivery instruction 238B, the second stop delivery instruction 238B including a second retail facility $\mathbf{110}_{nb}$ of the plurality of different retail facilities $\mathbf{110}_n$ in the same geographical area 235A, and a second delivery amount of the target SKU 221A The projected target SKU count 229A includes the first delivery amount and the second delivery amount. The first stop delivery instruction 238A can further includes a first stop target time 239A. The second stop delivery instruction 238B can further includes a second stop target time 239B. Execution of the programming 220 by the processor 205 can further configure the system 200 to implement the following functions periodically. The system 200 simulates, using the trained model 240, an effect of the first stop delivery instruction 238A and the second stop delivery instruction 238B on one or more transportation vehicles $\mathbf{107}_j$ at one or more intermediate facilities $\mathbf{105}_i$ servicing the plurality of different retail facilities $\mathbf{110}_n$ in the same geographical area 235A, to determine a delivery route 237A.

Figure 3:
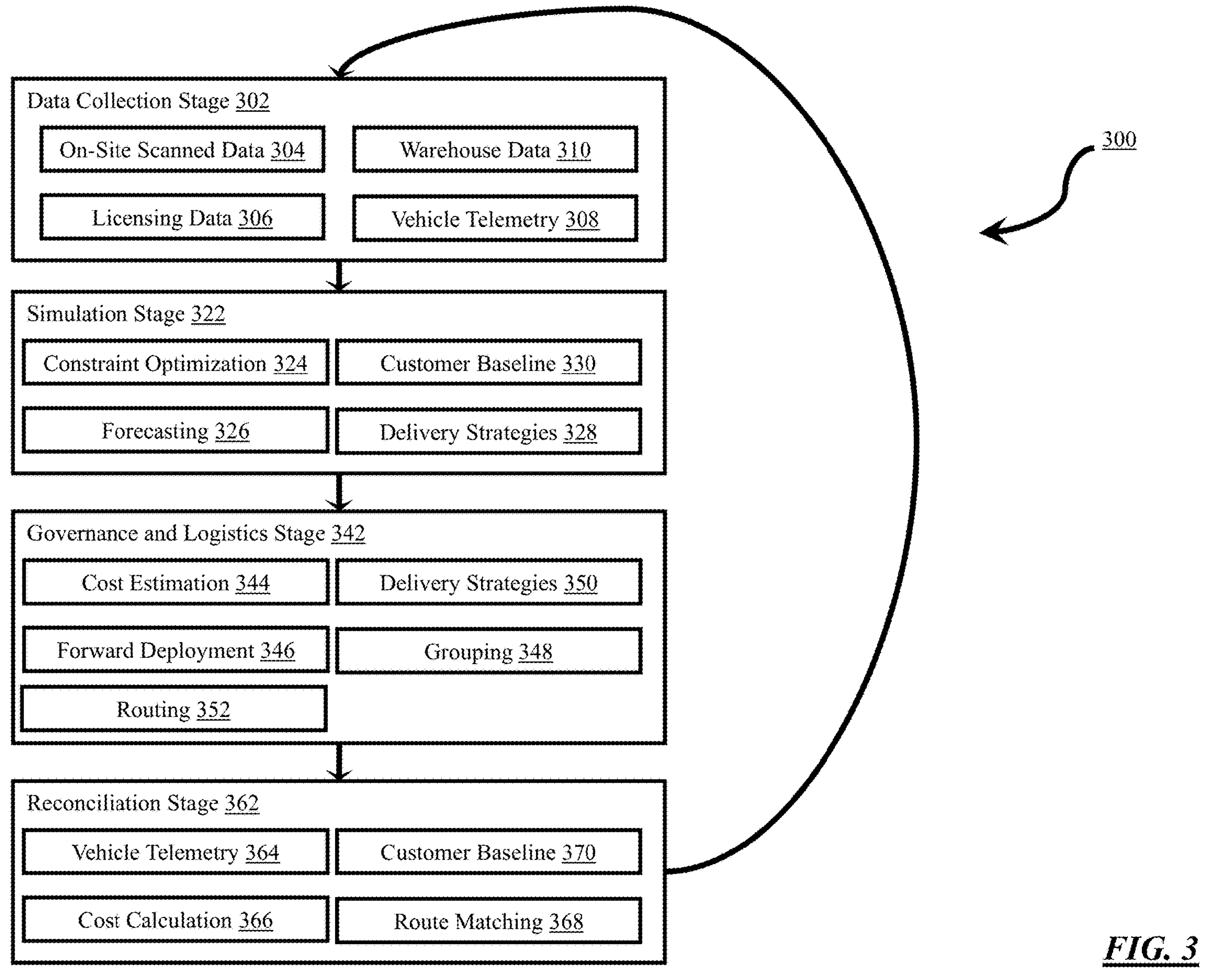
FIG. 3 depicts an exemplary dynamic assessment, organization, and reconciliation protocol to be implemented by a management server.

FIG. 3 depicts an exemplary dynamic assessment, organization, and reconciliation protocol 300 to be implemented by a management server 120. In various embodiments, the protocol 300 broadly collects input data, produces expected output data via a simulator, determines governance and logistics instructions and solutions based on that output data and existing rules, and reconciles differences between the governance rules, expected outcomes, and actual outcomes. In general, the protocol 300 is a periodically repeating protocol 300, and, as such, can start or terminate at any stage.

In the data collection stage 302, the protocol 300 collects data from various sources. The data sources can include on-site scanned data 304, which can include actual SKU counts 223A-C, stocking results report 232A-B, stop delivery outcomes 233A-B, any other data reported via the scanner device 250, sales device 251, retailer device 255, or driver device 252 pertaining to the on-site $\mathbf{115}_m$ area, or any other relevant metrics.

The data sources in the data collection stage 302 can also include, for example, licensing data 306, which includes any state licenses or licensing requirements, such as alcohol licenses, import licenses, federal firearms licenses, hunting and fishing licenses, environmental storage and disposal of returned, consumed, or expired goods requirements (e.g., disposing of used motor oil), sales taxing or tariff requirements, waiting periods; as well as contractual licenses, including order minimums and maximums, return policies, insurance policies, contracts of carriage or affreightment, retail order quantity minimums or maximums, retail sale price minimums and maximums (some retail facilities $\mathbf{110}_n$ may stock based on dollar values rather than quantities e.g., stocking $1,000 of a relevant good rather than fifty units of the relevant good), or any other relevant metrics.

The data sources in the data collection stage 302 can further include, for example, vehicle telemetry 308, which would include any information related to the movement of one or more vehicles $\mathbf{107}_j$, including vehicle $\mathbf{107}_j$ identifier, routes provisioned, routes actually driven, speeds, hard stops, stop-overs, frolic, detours, fuel efficiency, fuel used, fuel present in vehicle $\mathbf{107}_j$, money allegedly or actually spent on fuel for vehicle $\mathbf{107}_j$, driver 108 identity during any or all times vehicle $\mathbf{107}_j$ is in operation, blood-alcohol content of driver 108, dates and times vehicle $\mathbf{107}_j$ is on-duty or off-duty, gross vehicle weight, kerb weight, tare weight, payload weight, aggregate trailer mass, presence or absence of a trailer or trailers, weights of trailers, records of maintenance on and damage to vehicle $\mathbf{107}_j$, cost to operate vehicle $\mathbf{107}_j$, cost to idle vehicle $\mathbf{107}_j$, cost to park or store vehicle $\mathbf{107}_j$, or any other relevant metrics.

The data sources in the data collection stage 302 can further include warehouse data 310, which would include any information collected at or relevant to one or more warehouses $\mathbf{105}_i$, including warehouse $\mathbf{105}_i$ identifier, relevant goods at a warehouse $\mathbf{105}_i$, their locations and quantities in a warehouse $\mathbf{105}_i$, the delivery dates of those relevant goods to a warehouse 105$_i$, the production and/or expiration date of those relevant goods, the number and location of bays at a warehouse 105$_i$, the physical location and/or address of a warehouse 105$_i$, any limitations including hours and availability on any portion of or all of a warehouse 105$_i$, related to licensing data 306 any contracts or limitations on how long particular relevant goods can be stored or may remain in a warehouse 105$_i$, or any other relevant metrics.

The simulation state 322, which follows the data collection stage 302, uses the collected data from the data collection stage 302 in order to produce results from, or make updates to, trained model 240. Constraint optimization 324 includes focusing the trained model 240 on optimizing certain priorities or prerogatives, such as, for example, under-delivering less than 5% of deliveries, under-delivering by 50% less than 0.5% of any relevant good across all deliveries, reducing fuels costs, reducing the cash conversion cycle, reducing insurance risk inherent in holding valuable relevant goods, reducing payroll, increasing sales, increasing delivery velocity, reducing warehouse 105$_i$ average space requirements, reducing warehouse 105$_i$ peak space requirements, reducing number of deliveries per time period per retail facility 110$_n$, increasing number of deliveries per time period per retail facility 110$_n$, reducing date difference 227A-B, reducing delivery difference 234A-B, reducing breakage or shrink, reducing a vehicle 107$_j$ route distance, reducing a vehicle 107$_j$ route time, reducing delivery dwell time, reduce a vehicle 107$_j$ dwell time at a warehouse 105$_i$, reduce deliveries during operating hours of a retail facility 110$_n$, increase deliveries during operating hours of a retail facility 110$_n$, increase delivery windows during maximum ad hoc employee availability, increase delivery windows during minimum employee wage periods (e.g., not during overnight bonus periods, not during overtime or probabilistically overtime periods), as well as any other logistical, commercial, economic, or relevant priorities or prerogatives. Priorities and prerogatives can also be ranked and prioritized among one another, with a sliding scale, such as, for example, possibly dollarized prioritization (e.g., each minute of vehicle 107$_j$ dwell time is priced at $0.25, and each mile driven by a vehicle 107$_j$ is priced at $0.50—the simulation stage 322 can determine a lowest-cost route, in part, based on those prices), as well as absolute prioritization (reduce warehouse 105$_i$ average space requirements, but never allow stock of relevant good in warehouse 105$_i$ to fall below 25% of projected demand for the next three days, when optimizing amount of storage space required), as well as by any other relevant method of ranking and organizing priorities.

The simulation stage 322 can also produce forecasting 326, which can include projected target SKU count 229A-B, packing instruction 230A-C, delivery quotas 231C, and any other projections of future data points based on input data and the prior training of the trained model 240.

The simulation stage 322 can further produce delivery strategies 328, which can include delivery route 237A, stop delivery instructions 238A-B, stop target time 239A-B, and any other strategy relevant to moving relevant goods from a warehouse 105$_i$ to on-site 115$_m$ at a retail facility 110$_n$, including any strategy pertaining to moving the relevant goods from a vehicle 107$_j$ to a final retail location on-site 115$_m$ at a retail facility 110$_n$.

The simulation stage 322 can still further produce customer baselines 330, which can include target SKU count 222A-L and the projected target SKU counts 229A-B, or any other data points relevant to the amount of relevant goods a retail facility 110$_n$ is able to sell, display, store, lose, break, or otherwise dispose of, over a variety of time spans and periods.

The governance and logistics stage 342, which follows simulation stage 322, takes the simulation results from simulation stage 322, and applies rules and policies (for example, licensing data 306), in order to produce actionable data. For example, governance and logistics stage 342 may produce cost estimation 344, which determines, for example, actual costs, revenues, and profits in various stages and across the entire cash conversion cycle, based on the simulations performed in the simulation stage.

The governance and logistics stage 322 can also produce forward deployment 346 strategies, which involve placing resources on-site 115$_m$ at or before the arrival of a vehicle 107$_j$. By using delivery device 254, on-site loading 114 personnel can be directed to move to on-site 115$_m$, before and independently from the vehicle 107$_j$. By forward deploying resources, those resources do not need to be transported by vehicle 107$_j$, nor do those resources need to sit idle while a vehicle 107$_j$ moves between a warehouse 105$_i$ and a retail facility 110$_n$, or between multiple retail facilities 110$_n$.

The governance and logistics stage 322 can further produce grouping 348 strategies, which involve placing various relevant goods together or adjacent to one another, either in a vehicle 107$_j$ or at a warehouse 105$_i$, in order to facilitate final delivery. As discussed above, relevant goods can be grouped by retail facility 110$_n$ to which they will be delivered, by the relevant good itself, or a combination thereof.

The governance and logistics stage 322 can still further produce delivery strategies 350, which involve particular methods and orders of removing relevant goods from a vehicle 107$_j$ on-site 115$_m$ and either storing or stocking those relevant goods at a retail facility 110$_n$.

The governance and logistics stage 322 can yet further produce routing 352, which involves the particular route or routes a vehicle 107$_j$ will take from a warehouse 105$_i$ to one or more retail facilities 110$_n$, potentially returning to a warehouse 105$_j$.

The reconciliation stage 362, which follows the governance and logistics stage 342, takes the results of the deliveries, and uses those results to update values and assumptions in management server 120, and to re-train trained model 240. The results can include vehicle telemetry 364 as discussed above, actual cost calculations 366 as compared to projected cost estimations 344, actual customer baselines 370 as compared to simulated customer baselines 330, and route matching 368 as compared to produced routing 352. The reconciliation stage may utilize any objects 221-239, and any combinations of such objects, in memory 215 in order to assess discrepancies in the categories above, which are provided as input to the data collection stage 302.

FIG. 4 is a swimlane process flow diagram 400 depicting the steps taken by the direct agents 106, 108, 111-114 to efficiently deploy product. As discussed above, any step 401A-409E can be taken by any direct agent 106, 108, 111-114—however in this example generally steps 401A-409E are assigned to one or more direct agents 106, 108, 111-114 for whom it is most economically efficient to perform those steps 401A-409E.

Working backstock 401A, C involves being on-site 115$_m$ and moving any backstock out from storage into a sales area. Generally, this step would be performed by scanner 113 personnel, as doing so provides insight into their later steps, but a retailer 111 themselves could also restock from backstock, in particular if no other direct agents are on-site when stocking needs to be performed.

Counting inventory 402A-C involves collecting actual SKU counts 223A-F at the retail facility. This is a primary function of scanner 113 personnel, but salespersons 112 could also do so during a sales visit, or a retailer 111 could do so between visits from scanner 113 personnel and deliveries in order to provide more accurate and dynamic consumption rates for relevant goods, or to report emergent unexpected shortages of the relevant good.

Creating displays 403A-C involves preparing and producing on-site marketing and displays to improve sales velocity of the relevant good at a retail facility 110$_n$. Generally, the salesperson 112 drives marketing and sales, and creating displays 403B is likely on a longer cadence than the scanning-delivery cadence (e.g., deliveries occur weekly, marketing materials are revised quarterly), however scanner 113 personnel may be provisioned with signage for holiday or clearance sales, which they may be instructed. In some cases, the displays may be artistic or provocative stackings or organizations of the relevant good itself, in which case the on-site loading 114 personnel may also assist.

Adjusting pricing 404A-C involves updating signage, labels, and point-of-sale (POS) systems for changed pricing. Primarily, salesperson 112 will perform these adjustments to maximize profitability, but those changes may require the informed consent of the retailer 111, or the assistance of the retailer 111 in order to update the POS systems. The retailer 111 may also in some cases elect to take a smaller profit share and discount relevant goods at their discretion.

Placing orders 405A-C involves formally submitting an order, or revising a standing order or order instruction. Preferably, once the dynamic assessment, deployment, and reconciliation system 200 is servicing a particular retail facility 110$_n$, a formal order will not need to be submitted manually for each delivery—in such cases the act of submitting actual SKU counts 223A-F can qualify as placing orders 405A. However, for certain controlled products, retailer 111 may be required to formally place each order 405C, or salesperson 112 may only be able to place an order 405B with a renewed confirmation from the retailer 111, or may only be able to place an order 405B after reviewing counted inventory 402A, 402C.

Managing relationships 406B involves salesperson 112 interacting with retailer 111 or customers at a retail facility 110$_n$ to improve the relationship between retail facility 110$_n$ and an operator of the dynamic assessment, deployment, and reconciliation system 200. In doing so, more or preferred space for relevant goods, or preferred pricing, or openness to other relevant goods not stocked at retail facility 110$_n$ may be obtained by the salesperson 112. The introduction of scanner 113 personnel, scanner device 250, and retailer device 255 allows salesperson 112 more time to manage relationships 406B.

Order fulfillment 407F involves receiving packing instructions 230A-C, pulling those relevant goods out of storage in warehouse 105$_i$, and loading those relevant goods into a vehicle 107$_j$. Driving 408E involves moving a vehicle 107$_j$ from a warehouse 105$_i$ to a retail facility 110$_n$ on-site 115$_m$. Stocking 409B-E involves moving relevant goods from a vehicle 107$_j$ into a retail facility 110$_n$, either onto a sales floor area for retail customers to purchase, or into a backstock area, thereby creating the backstock to be worked in the work backstock 401A,C step.

Figure 5:
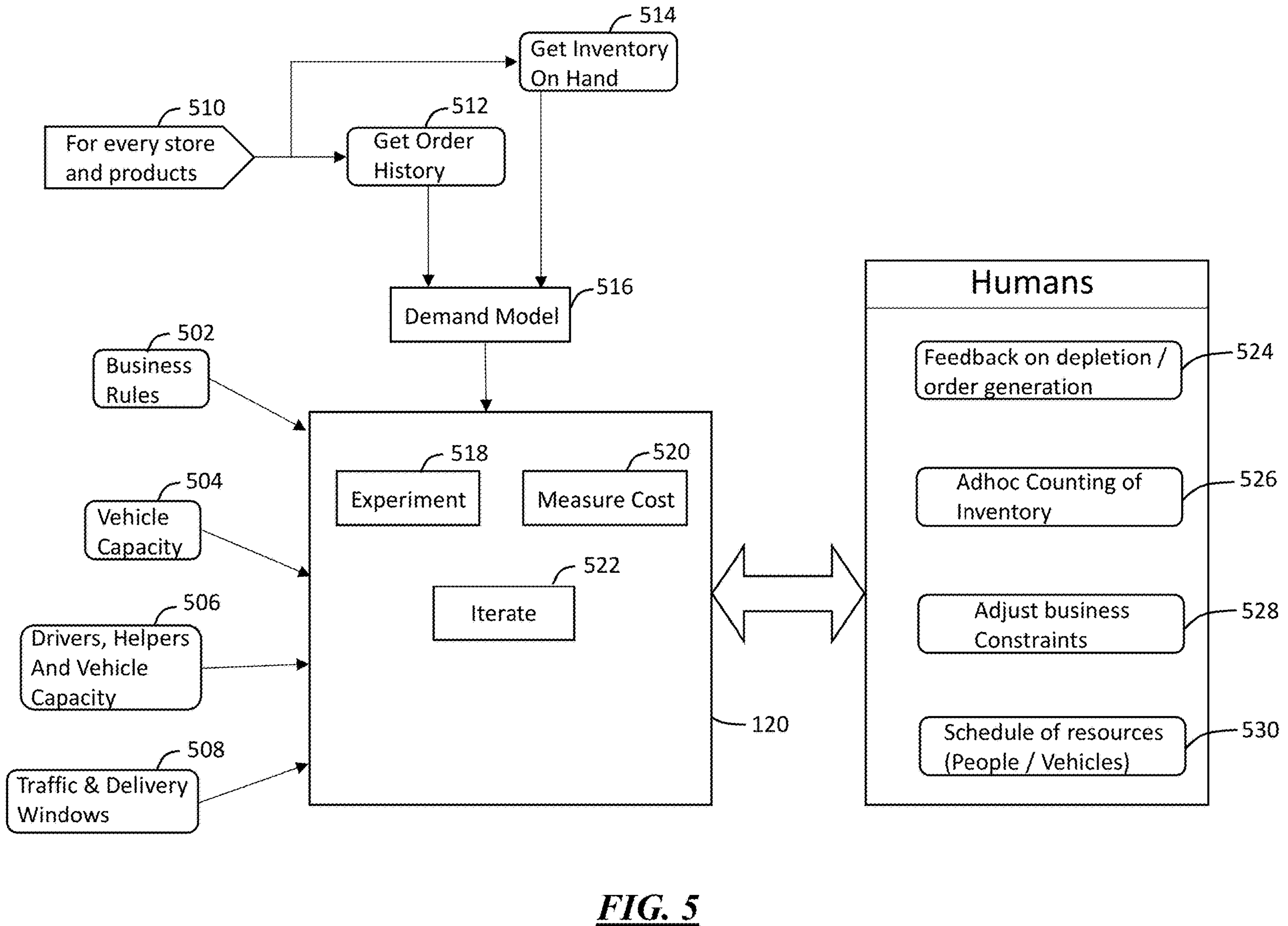
FIG. 5 is an exemplary diagram depicting inputs and outputs to a simulation stage implemented within a management server.
Figure 6:
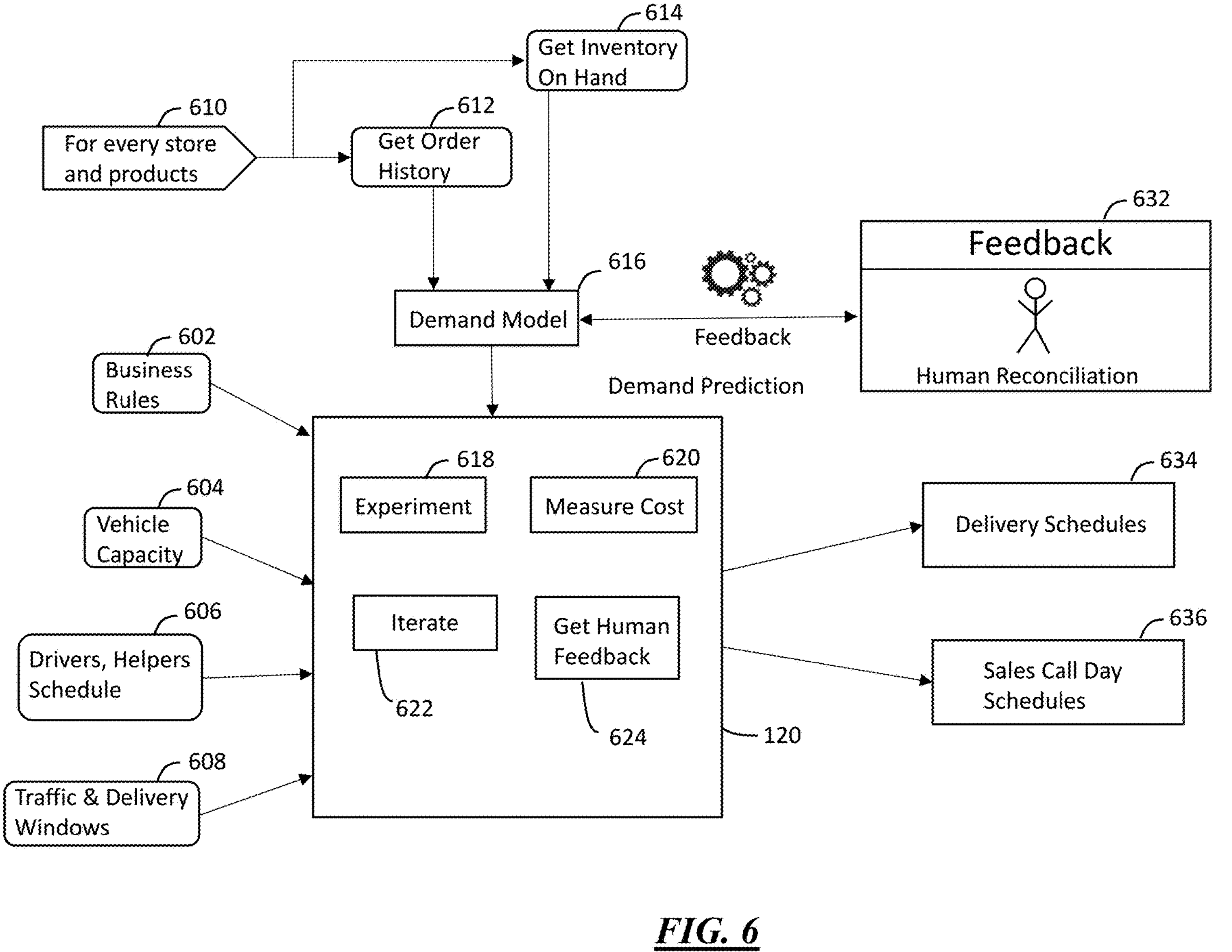
FIG. 6 is an alternative exemplary diagram depicting alternative inputs and outputs to a simulation stage implemented within a management server.

Exemplary factors involved in the system and method of the present disclosure are illustrated in FIGS. 5 and 6. Management server 120 may take into account, for example, inputs of an existing infrastructure's business rules (502, 602); vehicle 107$_j$ capacity (504, 604); capacity of driver 108 personnel, warehouse loading 106 personnel, salesperson 112 personnel, on-site loading 114 personnel, and/or on-site scanner 113 personnel (506, 606); and/or traffic and delivery windows (508, 608) respectively to begin analyzing the existing infrastructure. Further, management server 120 may, for each individual business unit/product, e.g. SKU, within the existing infrastructure (510, 610) accumulate an order history (512, 612) and inventory on hand (514, 614) in order to determine and model demand for each business unit/product (516, 616), and for reconciliation (632). Once management server 120 has established a baseline of the existing infrastructure, e.g. an understanding of the full context over the use of a physical space (e.g., at a retail facility 110$_n$ (or portion (e.g., relevant shelf) thereof), at a warehouse 105$_i$ (or portion (e.g., bay) thereof), on a vehicle 107$_j$ (or portion (e.g., bay) thereof), etc.), management server 120 may experiment (518, 618), measure cost (520, 620), and iterate (522, 622). In some embodiments, a user may provide feedback (624) on depletion/order generation (524), ad-hoc counting of inventory (526), manually adjusting business constraints (528), and/or schedule of resources (530), e.g. personnel (e.g., 106, 108, 112, 1134, 114;) and/or vehicles (e.g., 107$_j$), to further enhance the capability of management server 120 to adjust to the existing infrastructure. In various embodiments, based on its experimentation (518, 618), cost measurement (520, 620), iteration (522, 622), and/or receipt of feedback (524, 526, 528, 530, 624), management server 120 may dynamically generate delivery schedules (634), sales call day schedules (636) and/or optimzations to the same. In some embodiments, management server 120 may provide a decision making infrastructure that conducts/governs the use of assets/personnel of an existing infrastructure to maintain a peak efficient infrastructure without the need for human intervention.

Processors 205, 260A-F serve to perform various operations in accordance with, for example, instructions or programming 220, 270A-F executable by processors 205, 260A-F. For example, such operations may include operations related to communications with various dynamic assessment, deployment, and reconciliation system 200 elements, such as devices 250-255. Although a processor 205, 260A-F may be configured by use of hardwired logic, typical processors are general processing circuits configured by execution of programming. Processors 205, 260A-F include elements structured and arranged to perform one or more processing functions, typically various data processing functions. Although discrete logic components could be used, the examples utilize components forming a programmable CPU. A processor 205, 260A-F for example includes one or more integrated circuit (IC) chips incorporating the electronic elements to perform the functions of the CPU. The processors 205, 260A-F for example, may be based on any known or available microprocessor architecture, such as a Reduced Instruction Set Computing (RISC) using an ARM architecture, as commonly used today in mobile devices and other portable electronic devices. Alternatively, the processors 205, 260A-F for example, may be based on any known or available processor architecture, such as a Complex Instruction Set Computing (CISC) using an Intel architecture, as commonly used today in servers or personal computing devices. Of course, other processor circuitry may be used to form the CPU or processor hardware in other examples of management server 120 or device 250-255.

Program aspects of the technology may be thought of as "products" or "articles of manufacture" typically in the form of executable code or process instructions and/or associated data that is stored on or embodied in a type of machine or processor readable medium (e.g., transitory or non-transitory), such as memories 215, 265A-F, or a memory of a computer used to download or otherwise install such programming into the management server 120 or devices 250-255, or a transportable storage device or a communications medium for carrying program for installation in elements of the dynamic assessment, deployment, and reconciliation system 200.

A machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the command set customization and distribution of software, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, flash memory in a nodal device, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Any of the steps or functionality of the methods, protocols, and systems in FIGS. 2-6 described herein can be embodied in programming or one more applications as described previously. According to some examples, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, unless expressly stated otherwise, a parameter value or the like may vary by as much as ±10% from the stated amount.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A dynamic assessment, deployment and reconciliation system of a plurality of different, non-durable stock-keeping units (SKUs) for a plurality of different retail facilities in a plurality of different geographic locations, the system comprising:

a processor;

a network interface, configured for data communication over a network, coupled to the processor;

a memory coupled to the processor;

programming in the memory, wherein execution of the programming by the processor configures the system to implement functions, including, for each of a plurality of different target SKUs for different, non-durable SKUs, functions to periodically:

receive a target SKU count input of the target SKU;

over the network interface, receive an actual SKU count input of the target SKU on an assessment date;

determine a future delivery date, the future delivery date later than the assessment date;

calculate a date difference, the date difference based on a difference between the assessment date and the future delivery date;

calculate a count difference, the count difference based on a difference between the target SKU count input and the actual SKU count input;

simulate, using a trained model, an effect of time on a quantity of target SKU required for delivery, using the date difference and the count difference, to determine a projected target SKU count;

based on the projected target SKU count, issue a packing instruction, the packing instruction configured to instruct a packing of the target SKU onto a transportation vehicle at a dynamically selected intermediate facility;

based on an actual packing outcome of the transportation vehicle at the dynamically selected intermediate facility, issue a first stop delivery instruction, the first stop delivery instruction including the first retail facility and a first delivery amount of the target SKU;

over the network interface, receive a first stop delivery outcome, the first stop delivery outcome reporting a first delivered amount of the target SKU differing from the first delivery amount as a first delivery difference; and simulate, using the trained model, an effect of the first delivery difference on a quantity of the target SKU required for delivery to a second retail facility of the plurality of different retail facilities in the same geographical area, to dynamically determine an updated quantity of the target SKU required for delivery to the second retail facility.

2. The system of claim 1, wherein:

the trained model is periodically trained based on a training data set; and the training data set includes at least one data point wherein a data point date difference of the data point is greater or lesser than the date difference.

3. The system of claim 1, wherein execution of the programming by the processor further configures the system to implement functions, including, for each of the plurality of different target SKUs for different, non-durable SKUs, functions to periodically:

receive a stocking results report over the network interface, the stocking results report describing a difference between the projected target SKU count and an actual SKU quantity delivered; and re-train the trained model based on the stocking results report.

4. The system of claim 1, wherein the functions are further periodically implemented for each of a plurality of different retail facilities in each of a plurality of different geographic locations.

5. The system of claim 1, wherein:

execution of the programming by the processor further configures the system to implement functions, including, for each of the plurality of different target SKUs for different, non-durable SKUs, functions to periodically:

over the network interface, for each of a plurality of different retail facilities in the same geographical area, receive a respective actual SKU count input of the target SKU on a respective assessment date;

wherein the count difference is further based on a difference between the target SKU count input and a sum of the respective actual SKU count inputs of the target SKU; and the packing instruction further includes respective delivery quotas associated with each of the respective actual SKU count inputs of the target SKU.

6. The system of claim 1, wherein determining the first delivery amount of the target SKU and the updated quantity of the target SKU required for delivery to the second retail facility further comprises:

simulating, using the trained model, a plurality of candidate allocations of the target SKU among the first retail facility and the second retail facility, each candidate allocation associated with at least one performance metric comprising at least one of: a predicted under-delivery probability, a predicted over-delivery probability, or an expected transportation cost; and selecting, as the first delivery amount and the updated quantity, the allocation that optimizes the at least one performance metric subject to one or more delivery constraints.

7. The system of claim 1, wherein the first delivery amount of the target SKU is the projected target SKU count, and the actual SKU count input is captured at the first retail facility of the plurality of different retail facilities in the same geographical area on the assessment date.

8. The system of claim 1, further comprising a scanner device, wherein the actual SKU count input of the target SKU on the assessment date is configured to be received from the scanner device operated at an on-site location of the first retail facility.

9. The system of claim 1, wherein:

the first delivery amount of the target SKU, and the updated quantity of the target SKU required for delivery to the second retail facility of the plurality of different retail facilities in the same geographical area, are dynamically determined before the packing instruction is issued.

10. The system of claim 1, wherein the assessment date is on an assessment schedule; and execution of the programming by the processor further configures the system to implement functions, including functions to periodically:

simulate, using the trained model, an effect of the first delivery difference on the assessment schedule, to determine an updated assessment schedule.

11. The system of claim 1, wherein:

execution of the programming by the processor further configures the system to implement functions, including functions to periodically:

issue the first stop delivery instruction, the first stop delivery instruction including the first retail facility of a plurality of different retail facilities in the same geographical area, and the first delivery amount of the target SKU, and issue a second stop delivery instruction, the second stop delivery instruction including the second retail facility of the plurality of different retail facilities in the same geographical area, and the updated quantity of the target SKU as a second delivery amount of the target SKU; and the projected target SKU count includes the first delivery amount and the second delivery amount.

12. The system of claim 11, wherein:

the first stop delivery instruction further includes a first stop target time;

the second stop delivery instruction further includes a second stop target time; and execution of the programming by the processor further configures the system to implement functions, including functions to periodically:

simulate, using the trained model, an effect of the first stop delivery instruction and the second stop delivery instruction on one or more transportation vehicles at one or more intermediate facilities servicing the plurality of different retail facilities in the same geographical area, to determine a delivery route.

13. A method of assessing, deploying, and reconciling a plurality of different, non-durable stock-keeping units (SKUs) for a plurality of different retail facilities in a plurality of different geographic areas, the method comprising:

receiving a target SKU count input of a target SKU;

receiving an actual SKU count input of the target SKU on an assessment date;

determining a future delivery date, the future delivery date later than the assessment date;

calculating a date difference, the date difference based on a difference between the assessment date and the future delivery date;

calculating a count difference, the count difference based on a difference between the target SKU count input and the actual SKU count input;

simulating, using a trained model implementing sales velocity based on multi-period historical consumption rates, an effect of time on a quantity of target SKU required for delivery, using the date difference and the count difference, to determine a projected target SKU count, the projected target SKU count representing a predicted change in stock of the target SKU at a retail facility between the assessment date and the future delivery date; and based on the projected target SKU count, issuing a packing instruction, the packing instruction configured to instruct a packing of the target SKU onto a transportation vehicle at a dynamically selected intermediate facility.

14. The method of claim 13, further comprising:

receiving a stocking results report, the stocking results report describing a difference between the projected target SKU count and an actual SKU quantity delivered; and re-training the trained model based on the stocking results report.

15. The method of claim 13, further comprising:

for each of a plurality of different retail facilities in the same geographical area, receiving a respective actual SKU count input of the target SKU on a respective assessment date;

wherein:

the count difference is further based on a difference between the target SKU count and a sum of the respective actual SKU count inputs of the target SKU; and the packing instruction further includes respective delivery quotas associated with each of the respective actual SKU count inputs of the target SKU.

16. The method of claim 13, further comprising:

based on an actual packing outcome of the transportation vehicle at the dynamically selected intermediate facility, issuing a first stop delivery instruction, the first stop delivery instruction including a first retail facility of a plurality of different retail facilities in the same geographical area and a first delivery amount of the target SKU.

17. The method of claim 16, wherein the first delivery amount of the target SKU is the projected target SKU count, and the actual SKU count input is captured at the first retail facility of the plurality of different retail facilities in the same geographical area on the assessment date.

18. The method of claim 16, further comprising:

receiving a first stop delivery outcome, the first stop delivery outcome reporting a first delivered amount of the target SKU differing from the first delivery amount as a first delivery difference;

simulating, using the trained model, an effect of the first delivery difference on a quantity of the target SKU required for delivery to a second retail facility of the plurality of different retail facilities in the same geographical area, to dynamically determine an updated quantity of the target SKU required for delivery to the second retail facility; and simulating, using the trained model, an effect of the first delivery difference on an assessment schedule, to determine an updated assessment schedule;

wherein:

the first delivery amount of the target SKU, and the quantity of the target SKU required for delivery to the second retail facility of the plurality of different retail facilities in the same geographical area, are dynamically determined before the packing instruction is issued; and the assessment date is on the assessment schedule.

19. The method of claim 13, further comprising:

issuing a first stop delivery instruction, the first stop delivery instruction including a first retail facility of a plurality of different retail facilities in the same geographical area, and a first delivery amount of the target SKU, and issuing a second stop delivery instruction, the second stop delivery instruction including a second retail facility of the plurality of different retail facilities in the same geographical area, and a second delivery amount of the target SKU;

wherein the projected target SKU count includes the first delivery amount and the second delivery amount.

20. The method of claim 19, further comprising:

simulating, using the trained model, an effect of the first stop delivery instruction and the second stop delivery instruction on one or more transportation vehicles at one or more intermediate facilities servicing the plurality of different retail facilities in the same geographical area, to determine a delivery route;

wherein:

the first stop delivery instruction further includes a first stop target time; and the second stop delivery instruction further includes a second stop target time.

* * * * *